(12) United States Patent
Ito

(10) Patent No.: US 8,145,572 B2
(45) Date of Patent: Mar. 27, 2012

(54) INFORMATION PROCESSING APPARATUS, CONTENT PROCESSING METHOD, AND COMPUTER PROGRAM PRODUCT THEREOF

(75) Inventor: Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 753 days.

(21) Appl. No.: 12/234,208

(22) Filed: Sep. 19, 2008

(65) Prior Publication Data

US 2009/0106816 A1 Apr. 23, 2009

(30) Foreign Application Priority Data

Oct. 19, 2007 (JP) ................................ 2007-273172

(51) Int. Cl.
*G06F 21/00* (2006.01)
(52) U.S. Cl. ................. 705/59; 705/51; 726/1
(58) Field of Classification Search ............ 705/51, 705/59
See application file for complete search history.

(56) References Cited

U.S. PATENT DOCUMENTS

| | | | |
|---|---|---|---|
| 5,638,443 A | 6/1997 | Stefik et al. | |
| 7,113,912 B2 * | 9/2006 | Stefik et al. | 705/300 |
| 2005/0071662 A1 * | 3/2005 | Wada et al. | 713/193 |
| 2005/0094810 A1 * | 5/2005 | Kuan et al. | 380/200 |
| 2005/0271205 A1 * | 12/2005 | Shen et al. | 380/201 |
| 2006/0041512 A1 * | 2/2006 | Stefik | 705/57 |
| 2006/0095974 A1 * | 5/2006 | Ito et al. | 726/27 |
| 2006/0116966 A1 * | 6/2006 | Pedersen et al. | 705/59 |
| 2007/0016532 A1 * | 1/2007 | Zhang et al. | 705/59 |
| 2007/0083762 A1 * | 4/2007 | Martinez | 713/176 |
| 2008/0086757 A1 * | 4/2008 | Pestoni | 726/2 |
| 2009/0150219 A1 * | 6/2009 | Headings et al. | 705/10 |

OTHER PUBLICATIONS

"Information Technology-Multimedia Framework (MPEG-21)—Part 5: Rights Expression Language", International Standard, ISO/IEC 21000-5:2004(E), 2004, pp. 1-120.

* cited by examiner

*Primary Examiner* — Andrew J. Fischer
*Assistant Examiner* — C. Aaron McIntyre
(74) *Attorney, Agent, or Firm* — Oblon, Spivak, McClelland, Maier & Neustadt, L.L.P.

(57) ABSTRACT

When a conflict occurs among usage rules for content data, a verification on the content data is made in accordance with the conflict solution policy defined in the usage rule for each of the content data. Available content data are determined in correspondence with a combination of grant verification results individually made on the content data.

9 Claims, 35 Drawing Sheets

FIG.9

```
<?xml version= "1.0" encoding= "UTF-8"?>
<!--=LICENSE INFORMATION=-->
<r: license licensetID= "License C" CONFLICT SOLUTION POLICY= "strict">
<!--=========PLAYBACK LICENSE==========-->
    <r: grant>
        <!--=GRANTED OPERATION=-->
        <mx: play/>
    </r: grant>                                              ~2151

<!--=========PRINT LICENSE==========-->
    <r: grant>
        <!--=GRANTED OPERATION=-->
        <mx: print/>
    </r: grant>                                              ~2152

<!--=========REUSE LICENSE==========-->
    <r: grant>
        <!--=GRANTED OPERATION=-->
        <mx: adapt/>
    </r: grant>                                              ~2153
</r: license>
```

```
<?xml version= "1.0" encoding= "UTF-8"?>
<didl: DIDL>
    <didl: Item id= "Content A">
        <didl: Item id= "Content B"/>
        <didl: Item id= "Content C"/>
    </didl: Item>
</didl: DIDL>
```

T8, T9, T10

| CONTENT ID | VERIFICATION RESULT |
|---|---|
| CONTENT A | TRUE |
| CONTENT B | FALSE |
| CONTENT C | TRUE |

| r∈R(A) <sub>F1</sub> | r∈R(B) <sub>F2</sub> | r∈R(C) <sub>F3</sub> | RESULT <sub>F4</sub> | CAUSE <sub>F5</sub> |
|---|---|---|---|---|
| T | T | T | A(B, C) | nil |
| T | T | F | Deny | A, C |
| T | F | T | Deny | A, B |
| T | F | F | Deny | A, B, C |
| F | T | T | Deny | A |
| F | T | F | Deny | A, C |
| F | F | T | Deny | A, B |
| F | F | F | Deny | A, B, C |

| r∈R(A) <sub>F1</sub> | r∈R(B) <sub>F2</sub> | r∈R(C) <sub>F3</sub> | RESULT <sub>F4</sub> | CAUSE <sub>F5</sub> |
|---|---|---|---|---|
| T | T | T | A(B, C) | nil |
| T | T | F | Deny | A, C |
| T | F | T | Deny | A, B |
| T | F | F | Deny | A, B, C |
| F | T | T | Deny | A |
| F | T | F | Deny | A, C |
| F | F | T | Deny | A, B |
| F | F | F | Deny | A, B, C |

| r∈R(A) <sub>F1</sub> | r∈R(B) <sub>F2</sub> | r∈R(C) <sub>F3</sub> | RESULT <sub>F4</sub> | CAUSE <sub>F5</sub> |
|---|---|---|---|---|
| T | T | T | A(B, C) | nil |
| T | T | F | Deny | A, C |
| T | F | T | Deny | A, B |
| T | F | F | Deny | A, B, C |
| F | T | T | Deny | A |
| F | T | F | Deny | A, C |
| F | F | T | Deny | A, B, C |
| F | F | F | Deny | A, B, C |

| r∈R(A) | r∈R(B) | r∈R(C) | RESULT | CAUSE |
|---|---|---|---|---|
| T | T | T | A(B, C) | nil |
| T | T | F | Deny | A, C |
| T | F | T | Deny | A, B |
| T | F | F | Deny | A, B, C |
| F | T | T | Deny | A |
| F | T | F | Deny | A, C |
| F | F | T | Deny | A, B |
| F | F | F | Deny | A, B, C |

| r∈R(A) | r∈R(B) | r∈R(C) | RESULT | CAUSE |
|---|---|---|---|---|
| T | T | T | A(B, C) | nil |
| T | T | F | nil(B, nil) | A, C |
| T | F | T | nil(nil, C) | A, B |
| T | F | F | Deny | B, C |
| F | T | T | Deny | A, B, C |
| F | T | F | Deny | A, B, C |
| F | F | T | Deny | A, B, C |
| F | F | F | Deny | A, B, C |

| r∈R(A) | r∈R(B) | r∈R(C) | RESULT | CAUSE |
|---|---|---|---|---|
| T | T | T | A(B, C) | nil |
| T | T | F | A(B, nil) | C |
| T | F | T | nil(nil, C) | A, B |
| T | F | F | Deny | A, B, C |
| F | T | T | nil(nil, C) | A, B |
| F | T | F | Deny | A, B, C |
| F | F | T | nil(nil, C) | A, B |
| F | F | F | Deny | A, B, C |

| r∈R(A) | r∈R(B) | r∈R(C) | RESULT | CAUSE |
|---|---|---|---|---|
| T | T | T | A(B, C) | nil |
| T | T | F | nil(B, nil) | A, C |
| T | F | T | A(nil, C) | B |
| T | F | F | Deny | A, B, C |
| F | T | T | nil(B, nil) | A, C |
| F | T | F | nil(B, nil) | A, C |
| F | F | T | Deny | A, B, C |
| F | F | F | Deny | A, B, C |

| r∈R(A) | r∈R(B) | r∈R(C) | RESULT | CAUSE |
|---|---|---|---|---|
| T | T | T | A(B, C) | nil |
| T | T | F | A(B, nil) | C |
| T | F | T | A(nil, C) | B |
| T | F | F | A(nil, nil) | B, C |
| F | T | T | nil(nil, C) | A |
| F | T | F | nil(B, nil) | A, C |
| F | F | T | nil(nil, C) | A, B |
| F | F | F | Deny | A, B, C |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | Deny | A |
| F | T | F | Deny | A |
| F | F | T | Deny | A, B |
| F | F | F | Deny | A, B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | Deny | A |
| F | T | F | Deny | A |
| F | F | T | Deny | A, B |
| F | F | F | Deny | A, B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | B | nil |
| F | T | F | B | nil |
| F | F | T | Deny | B |
| F | F | F | Deny | B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | B | nil |
| F | T | F | B | nil |
| F | F | T | Deny | B |
| F | F | F | Deny | B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | Deny | A |
| F | T | F | Deny | A |
| F | F | T | Deny | A, B |
| F | F | F | Deny | A, B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | Deny | A |
| F | T | F | Deny | A |
| F | F | T | Deny | A, B |
| F | F | F | Deny | A, B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | B | nil |
| F | T | F | B | nil |
| F | F | T | Deny | B |
| F | F | F | Deny | B |

| r∈R(A) | r∈R(B) | r∈R(C) | RESULT | CAUSE |
|---|---|---|---|---|
| T | T | T | B | nil |
| T | T | F | B | nil |
| T | F | T | Deny | B |
| T | F | F | Deny | B |
| F | T | T | B | nil |
| F | T | F | B | nil |
| F | F | T | Deny | B |
| F | F | F | Deny | B |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | Deny | A |
| F | T | F | Deny | A, C |
| F | F | T | Deny | A |
| F | F | F | Deny | A, C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | C | nil |
| F | T | F | Deny | C |
| F | F | T | C | nil |
| F | F | F | Deny | C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | Deny | A |
| F | T | F | Deny | A, C |
| F | F | T | Deny | A |
| F | F | F | Deny | A, C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | C | nil |
| F | T | F | Deny | C |
| F | F | T | C | nil |
| F | F | F | Deny | C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | Deny | A |
| F | T | F | Deny | A, C |
| F | F | T | Deny | A |
| F | F | F | Deny | A, C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | C | nil |
| F | T | F | Deny | C |
| F | F | T | C | nil |
| F | F | F | Deny | C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | Deny | A |
| F | T | F | Deny | A, C |
| F | F | T | Deny | A |
| F | F | F | Deny | A, C |

| r∈R(A) | r∈R(B) | r∈R(C) | RESULT | CAUSE |
|---|---|---|---|---|
| T | T | T | C | nil |
| T | T | F | Deny | C |
| T | F | T | C | nil |
| T | F | F | Deny | C |
| F | T | T | C | nil |
| F | T | F | Deny | C |
| F | F | T | C | nil |
| F | F | F | Deny | C |

| r∈R(D) | r∈R(E) | r∈R(F) | RESULT | CAUSE |
|---|---|---|---|---|
| T | T | T | D(E(F)) | nil |
| T | T | F | Deny | D, E, F |
| T | F | T | Deny | D, E, F |
| T | F | F | Deny | D, E, F |
| F | T | T | Deny | D, E, F |
| F | T | F | Deny | D, E, F |
| F | F | T | Deny | D, E, F |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | D, E, F |
| T | F | T | Deny | D, E |
| T | F | F | Deny | D, E, F |
| F | T | T | Deny | D, E |
| F | T | F | Deny | D, E, F |
| F | F | T | Deny | D, E |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | D, F |
| T | F | T | Deny | D, E, F |
| T | F | F | Deny | D, E, F |
| F | T | T | Deny | D, F |
| F | T | F | Deny | D, F |
| F | F | T | Deny | D, E, F |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | D, F |
| T | F | T | Deny | D, E |
| T | F | F | Deny | D, E, F |
| F | T | T | Deny | D |
| F | T | F | Deny | D, F |
| F | F | T | Deny | D, E |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | D, E, F |
| T | F | T | Deny | D, E, F |
| T | F | F | Deny | D, E, F |
| F | T | T | Deny | D, E, F |
| F | T | F | Deny | D, E, F |
| F | F | T | Deny | D, E, F |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | E, F |
| T | F | T | Deny | D, E, F |
| T | F | F | Deny | D, E, F |
| F | T | T | Deny | D, E |
| F | T | F | Deny | D, E, F |
| F | F | T | Deny | D, E |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | Deny | F |
| T | F | T | Deny | E, F |
| T | F | F | Deny | E, F |
| F | T | T | Deny | D, F |
| F | T | F | Deny | D, F |
| F | F | T | Deny | D, E, F |
| F | F | F | Deny | D, E, F |

| r∈R(D) | r∈R(E) | r∈R(F) | RESULT | CAUSE |
|---|---|---|---|---|
| T | T | T | D(E(F)) | nil |
| T | T | F | D(E(nil)) | F |
| T | F | T | D(nil(F)) | E |
| T | F | F | D(nil(nil)) | E, F |
| F | T | T | nil(E(F)) | D |
| F | T | F | nil(E(nil)) | D, F |
| F | F | T | nil(nil(F)) | D, E |
| F | F | F | Deny | D, E, F |

| r∈R(D) | r∈R(E) | r∈R(F) | RESULT | CAUSE |
|---|---|---|---|---|
| T | T | T | E(F) | nil |
| T | T | F | Deny | F |
| T | F | T | Deny | E |
| T | F | F | Deny | E, F |
| F | T | T | Deny | D |
| F | T | F | Deny | D, F |
| F | F | T | Deny | D, E |
| F | F | F | Deny | D, E, F |

| r∈R(D) | r∈R(E) | r∈R(F) | RESULT | CAUSE |
|---|---|---|---|---|
| T | T | T | E(F) | nil |
| T | T | F | Deny | F |
| T | F | T | Deny | E |
| T | F | F | Deny | E, F |
| F | T | T | Deny | E |
| F | T | F | Deny | E, F |
| F | F | T | Deny | E |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | Deny | F |
| T | F | T | Deny | E, F |
| T | F | F | Deny | E, F |
| F | T | T | Deny | F |
| F | T | F | Deny | F |
| F | F | T | Deny | E, F |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | E(nil) | F |
| T | F | T | nil(F) | E |
| T | F | F | Deny | E, F |
| F | T | T | E(F) | nil |
| F | T | F | E(nil) | F |
| F | F | T | nil(F) | E |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | Deny | E, F |
| T | F | T | Deny | E, F |
| T | F | F | Deny | E, F |
| F | T | T | Deny | E, F |
| F | T | F | Deny | E, F |
| F | F | T | Deny | E, F |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | Deny | E, F |
| T | F | T | Deny | E |
| T | F | F | Deny | E, F |
| F | T | T | Deny | E |
| F | T | F | Deny | E, F |
| F | F | T | Deny | E |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | Deny | E, F |
| T | F | T | Deny | E, F |
| T | F | F | Deny | E, F |
| F | T | T | Deny | F |
| F | T | F | Deny | F |
| F | F | T | Deny | E, F |
| F | F | F | Deny | E, F |

| r∈R(D) | r∈R(E) | r∈R(F) | RESULT | CAUSE |
|---|---|---|---|---|
| T | T | T | E(F) | nil |
| T | T | F | E(nil) | F |
| T | F | T | nil(F) | E |
| T | F | F | Deny | E, F |
| F | T | T | E(F) | nil |
| F | T | F | E(nil) | F |
| F | F | T | nil(F) | E |
| F | F | F | Deny | E, F |

| r∈R(D) | r∈R(E) | r∈R(F) | RESULT | CAUSE |
|---|---|---|---|---|
| T | T | T | F | nil |
| T | T | F | Deny | F |
| T | F | T | Deny | F |
| T | F | F | Deny | F |
| F | T | T | Deny | F |
| F | T | F | Deny | F |
| F | F | T | Deny | F |
| F | F | F | Deny | F |

| r∈R(D) | r∈R(E) | r∈R(F) | RESULT | CAUSE |
|---|---|---|---|---|
| T | T | T | F | nil |
| T | T | F | Deny | F |
| T | F | T | F | nil |
| T | F | F | Deny | F |
| F | T | T | F | nil |
| F | T | F | Deny | F |
| F | F | T | F | nil |
| F | F | F | Deny | F |

| r∈R(D) | r∈R(E) | r∈R(F) | RESULT | CAUSE |
|---|---|---|---|---|
| T | T | T | F | nil |
| T | T | F | Deny | F |
| T | F | T | Deny | F |
| T | F | F | Deny | F |
| F | T | T | Deny | F |
| F | T | F | Deny | F |
| F | F | T | Deny | F |
| F | F | F | Deny | F |

Columns: F1, F2, F3, F4, F5

| r∈R(D) | r∈R(E) | r∈R(F) | RESULT | CAUSE |
|---|---|---|---|---|
| T | T | T | F | nil |
| T | T | F | Deny | F |
| T | F | T | F | nil |
| T | F | F | Deny | F |
| F | T | T | F | nil |
| F | T | F | Deny | F |
| F | F | T | F | nil |
| F | F | F | Deny | F |

Columns: F1, F2, F3, F4, F5

| r∈R(D) | r∈R(E) | r∈R(F) | RESULT | CAUSE |
|---|---|---|---|---|
| T | T | T | F | nil |
| T | T | F | Deny | F |
| T | F | T | Deny | F |
| T | F | F | Deny | F |
| F | T | T | Deny | F |
| F | T | F | Deny | F |
| F | F | T | Deny | F |
| F | F | F | Deny | F |

Columns: F1, F2, F3, F4, F5

| r∈R(D) | r∈R(E) | r∈R(F) | RESULT | CAUSE |
|---|---|---|---|---|
| T | T | T | F | nil |
| T | T | F | Deny | F |
| T | F | T | F | nil |
| T | F | F | Deny | F |
| F | T | T | F | nil |
| F | T | F | Deny | F |
| F | F | T | F | nil |
| F | F | F | Deny | F |

| r∈R(D) | r∈R(E) | r∈R(F) | RESULT | CAUSE |
|---|---|---|---|---|
| T | T | T | F | nil |
| T | T | F | Deny | F |
| T | F | T | Deny | F |
| T | F | F | Deny | F |
| F | T | T | Deny | F |
| F | T | F | Deny | F |
| F | F | T | Deny | F |
| F | F | F | Deny | F |

| r∈R(D) | r∈R(E) | r∈R(F) | RESULT | CAUSE |
|---|---|---|---|---|
| T | T | T | F | nil |
| T | T | F | Deny | F |
| T | F | T | F | nil |
| T | F | F | Deny | F |
| F | T | T | F | nil |
| F | T | F | Deny | F |
| F | F | T | F | nil |
| F | F | F | Deny | F |

FIG.68

```
<?xml version="1.0" encoding="UTF-8"?>
<didl:DIDL>
    <didl:Item id="ContentA">
        <didl:Descriptor>
            <didl:Statement mimeType="text/xml">
                <r:license licenseId="LicenseA">
                    :
                </r:license>
            </didl:Statement>
        </didl:Descriptor>
        <didl:Component>
            <didl:Resource ref="Text1.html" mimeType="text/html"/>
        </didl:Component>
        <didl:Item id="ContentC">
            <didl:Descriptor>
                <didl:Statement mimeType="text/xml">
                    <r:license licenseId="LicenseC">
                        :
                    </r:license>
                </didl:Statement>
            </didl:Descriptor>
            <didl:Component>
                <didl:Resource ref="Picture1.jpeg" mimeType="image/jpeg"/>
            </didl:Component>
        </didl:Item>
    </didl:Item>
</didl:DIDL>
```

INFORMATION PROCESSING APPARATUS, CONTENT PROCESSING METHOD, AND COMPUTER PROGRAM PRODUCT THEREOF

CROSS-REFERENCE TO RELATED APPLICATIONS

This application is based upon and claims the benefit of priority from the prior Japanese Patent Application No. 2007-273172, filed on Oct. 19, 2007; the entire contents of which are incorporated herein by reference.

BACKGROUND OF THE INVENTION

1. Field of the Invention

The present invention relates to an information processing apparatus that controls the use of composite contents data formed of multiple content data in accordance with usage rules for each content data, and a method and a computer program product for processing such contents.

2. Description of the Related Art

As the contents business becomes diversified and goes online, more flexible digital rights management (DRM) has been requested. For example, the content data are separated from usage rules that describe the usage rules for the content data, thereby offering a contents protecting system that can control the use of the contents in an adaptable manner. Moreover, ISO/IEC 21000 (MPEG-21), which is targeted at distribution and management of various digital contents, includes standards of the rights expression language REL (hereinafter, "MPEG-21 REL") that flexibly describes usage rules.

The use of the composite contents data formed of multiple content data for which usage rules are defined, such as of edited literary works and quoted works, is controlled by the usage rule of each of the content data. However, when the content data have a nesting structure and the usage rule of a superordinate content data differs from the usage rule of its subordinate content data, the verification result on the use of one content data may conflict with the verification result on the use of another content data.

For example, the usage rule of the top content data, which indicates the entire composite contents data, may permit general users to browse the contents, but the usage rule of its subordinate content data, which is a component of the top content data, may permit only limited users to browse. In such a case, the verification on the use differs depending on the authorization given to each user. Furthermore, the usage rule of the top content data may permit printing and browsing, but the usage rule of its subordinate content data may permit browsing only. Then, the verification of the use differs depending on how the contents will be used. In such a situation, the usage control intended by the creator of the composite contents data may be unable to perform.

Various methods have been suggested to solve the above problem. For example, U.S. Pat. No. 5,638,443 discloses two controlling modes using "strict rule" and "more lenient rule" to solve the conflict as described above.

By the "strict rule", the use of a content data is permitted only when the same usage rule is satisfied for all of the superordinate content data and subordinate content data of the content data. In other words, if the content data include a single material that is denied, the use of the entire composite contents data is denied.

By the "more lenient rule", when the composite contents data is to be used, the control is performed in a manner to permit the use of content data of the composite contents data that satisfy the usage rule only.

According to the technology described in U.S. Pat. No. 5,638,443, however, the above control method cannot be explicitly designated as a usage rule, and thus the method is applied independently of the usage rule defined by the usage rule. For this reason, the use permitted to the user changes in accordance with the control method. Then, the control may deviate from the usage rule intended by the contents provider such as the creator of the composite contents data or the creators of the content data.

For example, the composite contents data may include some content data that are intended to be widely distributed, but there may be a strict rule for the use of the edited work of these materials (composite contents data). Then, in a system operating in accordance with the "strict rule" controlling method, the usage rule for the entire composite contents data is applied, which strictly limits the use of the content data. This would limit the opportunity of using the materials, on the contrary to the original intention of the creators of the materials. On the other hand, in the same situation with a system operating in accordance with the "more lenient rule" controlling method, the intention of the creator of the composite contents data wishing to protect one's creation as an edited work may not be carried out.

SUMMARY OF THE INVENTION

According to one aspect of the present invention, an information processing apparatus includes a first storage unit that stores composite contents data hierarchically composed of a plurality of content data that are individually usable; a second storage unit that stores usage rules and conflict solution policies in association with one another, the usage rules individually defining conditions for verifying a grant/denial of use for each of the content data, the conflict solution policies defining a determination method of verifying the grant/denial of use when a conflict occurs among the results of the grant/denial of use between the usage rule and the other usage rules; a first receiving unit that receives a designation of a specific content data from among the content data composing the composite contents data; a second receiving unit that receives an input of a selected usage rule among the said usage rules; a first verifying unit that reads usage rules for the specific content data and for other content data related to the specific content data from the second storage unit individually, and verifies whether the selected usage rule satisfies each of the usage rules; a second verifying unit that verifies which of the content data is available based on the determination method of the conflict solution policies associated with the usage rules for each of the content data, when verification results made by the first verifying unit do not agree with one another; a conflict solving unit that generates structural information indicating a structure of content data verified as being available by the second verifying unit; and a generating unit that generates partial granted contents data that is obtained by extracting available content data from the first storage unit, based on the structural information.

According to another aspect of the present invention, a content processing method is performed by an information processing apparatus, wherein the apparatus includes a first storage unit that stores composite contents data hierarchically composed of a plurality of content data that are individually usable, and a second storage unit that stores usage rules and conflict solution policies in association with one another, the usage rules individually defining conditions for verifying a grant/denial of use for each of the content data, the conflict solution policies defining a determination method of verifying the grant/denial of use when a conflict occurs among the results of the grant/denial of use between the usage rule and the other the usage rules.

The content processing method includes receiving a designation of a specific content data from among the content data composing the composite contents data; receiving an input of a selected usage rule to compare with the usage rules; verifying whether the selected usage rule satisfies the usage rules for the specific content data and for other content data related to the specific content data stored in the second storage unit; verifying which of the content data is available based on the determination method of the conflict solution policies associated with the usage rules for each of the content data, when verification results for the selected usage rule to the usage rule do not agree with one another; generating structural information indicating a structure of available content data; and generating partial granted contents data that is obtained by extracting available content data from the first storage unit, based on the structural information.

According to still another aspect of the present invention, a computer program product having a computer readable medium including programmed instructions is executable in a computer, wherein the computer includes a first storage unit that stores composite contents data hierarchically composed of a plurality of content data that are individually usable, and a second storage unit that stores usage rules and conflict solution policies in association with one another, the usage rules individually defining conditions for verifying a grant/denial of use for each of the content data, the conflict solution policies defining a determination method of verifying the grant/denial of use when a conflict occurs among the results of the grant/denial of use between the usage rule and the other the usage rules.

The instructions included in the computer program product, when executed by the computer, cause the computer to perform: receiving a designation of a specific content data from among the content data composing the composite contents data; receiving an input of a selected usage rule to compare with the usage rules; verifying whether the selected usage rule satisfies the usage rules for the specific content data and for other content data related to the specific content data stored in the second storage unit; verifying which of the content data is available based on the determination method of the conflict solution policies associated with the usage rules for each of the content data, when verification results for the selected usage rule to the usage rule do not agree with one another; generating structural information indicating a structure of available content data; and generating partial granted contents data that is obtained by extracting available content data from the first storage unit, based on the structural information.

BRIEF DESCRIPTION OF THE DRAWINGS

FIG. 9 is a diagram for showing still another example of a usage rule;

FIGS. 16 to 39 are diagrams for showing a verification result obtained from the conflict solving process performed on the composite contents data of FIG. 3;

FIGS. 40 to 63 are diagrams for showing a verification result obtained from the conflict solving process performed on the composite contents data of FIG. 5;

FIG. 68 is a diagram for showing an example of partial granted contents data described in MPEG-21 format.

DETAILED DESCRIPTION OF THE INVENTION

Exemplary embodiments of an information processing apparatus, a method, and a computer program product according to the present invention are explained below with reference to the attached drawings. In the following embodiments, the information processing apparatus according to the present invention is applied to a content processing apparatus such as a personal computer (PC). However, the application is not limited thereto. The information processing apparatus is applicable to any device that can process composite contents data such as a portable terminal and a printer.

Figure 1:
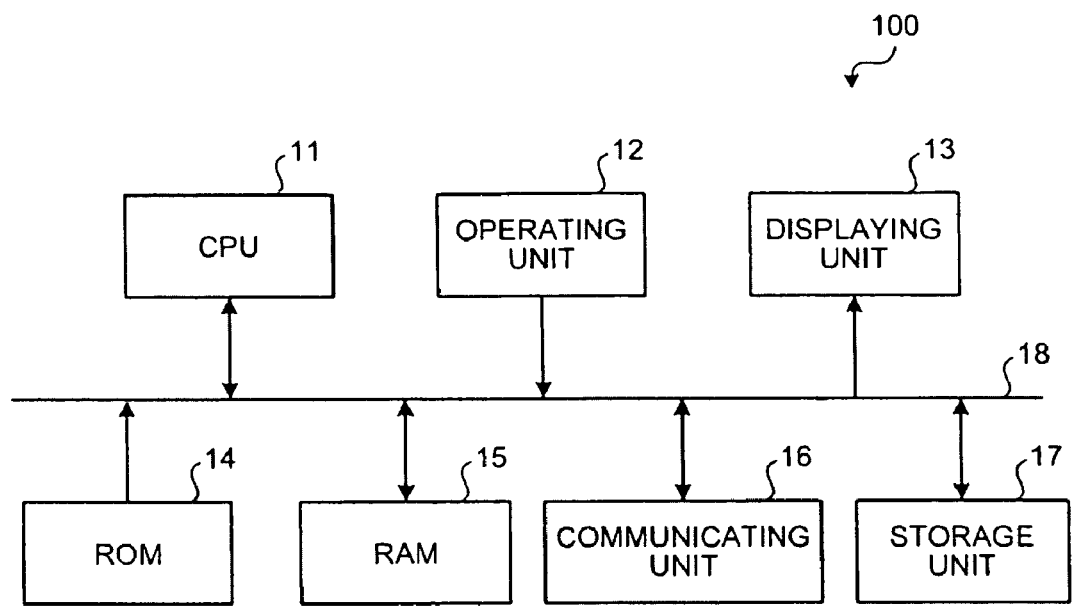
FIG. 1 is a diagram of a hardware structure of a content processing apparatus.

FIG. 1 is a diagram of a hardware structure of a content processing apparatus 100. The content processing apparatus 100 includes a central processing unit (CPU) 11, an operating unit 12, a displaying unit 13, a read only memory (ROM) 14, a random access memory (RAM) 15, a communicating unit 16, and a storage unit 17, each of which is connected to one another by way of a bus 18.

The CPU 11 executes various processes together with various control programs prestored in the ROM 14 or the storage unit 17, by using a certain area of the RAM 15 as a work area. The CPU 11 thereby performs overall control of the units included in the content processing apparatus 100.

In addition, the CPU 11 realizes, together with the control programs prestored in the ROM 14 or the storage unit 17, the functions of operational units that are discussed later (a contents displaying/designating unit 21, an operation/condition designating unit 22, a content structure analyzing unit 23, an individual material verifying unit 24, a conflict solving unit 25, a contents conflict solving unit 26, a partial-granted contents-data generating/presenting unit 27, a contents operation executing unit 28, and a reason presenting unit 29). The operations of those units will be discussed later.

The operating unit 12 includes various input keys and a pointing device, and outputs to the CPU 11 command signals input by the user.

The displaying unit 13 is formed of a display device such as a liquid crystal display (LCD), and displays various kinds of information based on a display signal received from the CPU 11. The displaying unit 13 may be configured to form a touch panel integrally with the operating unit 12.

The ROM 14 stores therein programs and various setting information for controlling the content processing apparatus 100 in a manner that the data cannot be rewritten.

The RAM 15 is a volatile memory device such as a SDRAM, offering a work area to the CPU 11 and serving as a buffer.

The communicating unit 16 is an interface for communications with external devices. The communicating unit 16 outputs various information transmitted by the external devices to the CPU 11, and transmits various information output by the CPU 11 to the external devices.

The storage unit 17 includes a magnetically or optically recordable non-volatile memory device and stores therein programs and various setting information for controlling the content processing apparatus 100 in a rewritable manner. The storage unit 17 stores therein contents data 31 and usage rules 32, which will be described later, as well as a policy priority order as setting information to be used in the overall process, which will also be described later.

Figure 2:
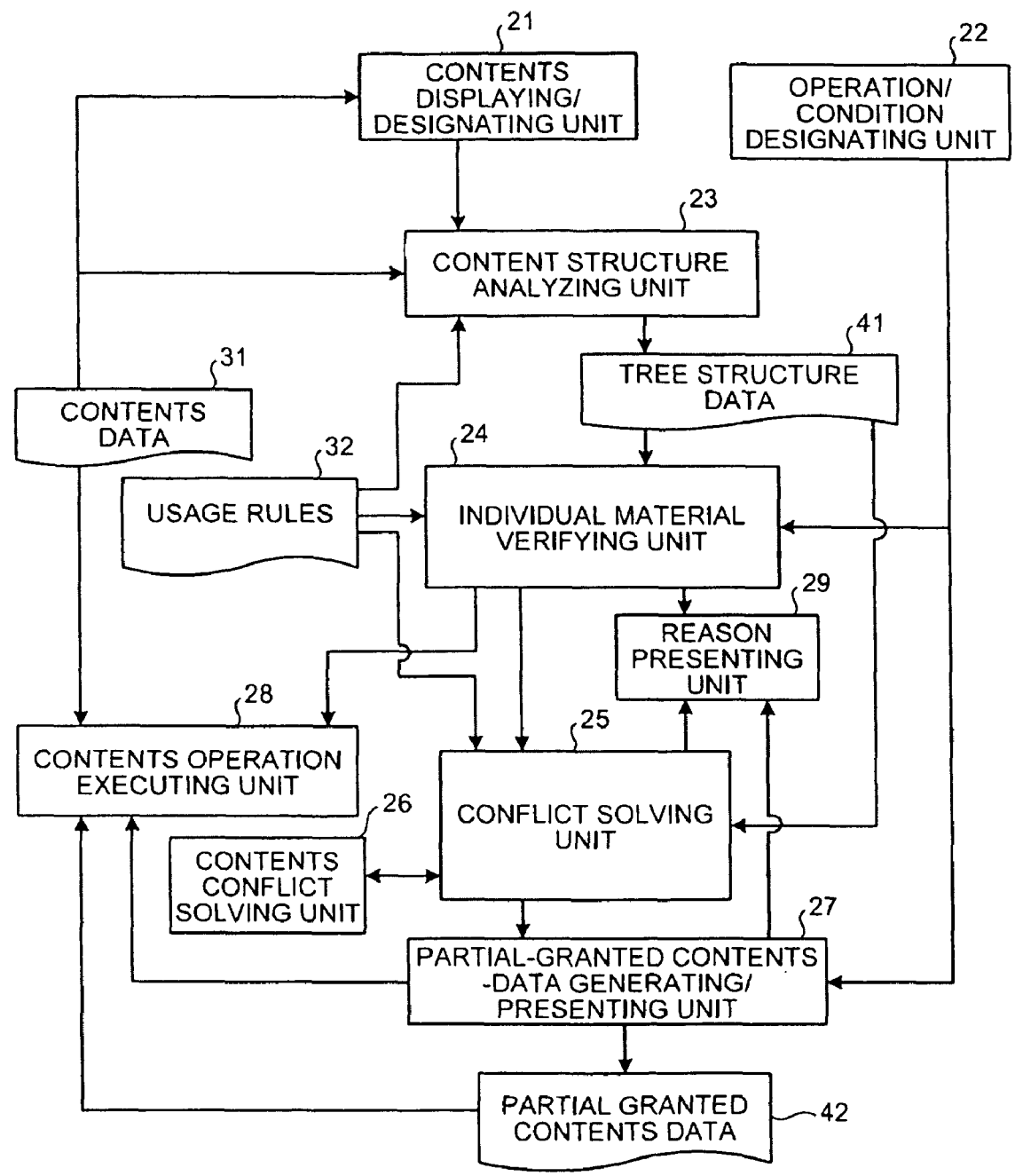
FIG. 2 is a diagram of a functional structure of the content processing apparatus.

FIG. 2 is a diagram of a functional structure of the content processing apparatus 100. The content processing apparatus 100 includes the contents displaying/designating unit 21, the operation/condition designating unit 22, the content structure analyzing unit 23, the individual material verifying unit 24, the conflict solving unit 25, the contents conflict solving unit 26, the partial-granted contents-data generating/presenting unit 27, the contents operation executing unit 28, and the reason presenting unit 29.

The content processing apparatus 100 reads the contents data 31 and the usage rules 32 as input data, and outputs partial granted contents data 42 as output data. The content processing apparatus 100 also generates, as intermediate data, tree structure data 41, individual material verification data (not shown), a structure list (not shown), and a reason list (not shown).

The contents data 31 is composite contents data in which multiple content data that can be individually used are hierarchically included, and is stored in advance in the storage unit 17. Any number of items of the contents data 31 and any number of content data in the contents data 31 can be adopted and stored in the storage unit 17.

The usage rules 32 are a group of data individually defining a usage rule for each content data of the contents data 31, and are stored in advance in the storage unit 17 integrally with or separately from the corresponding item of the contents data 31. The contents data 31 and the usage rules 32 are explained below.

Figure 3:
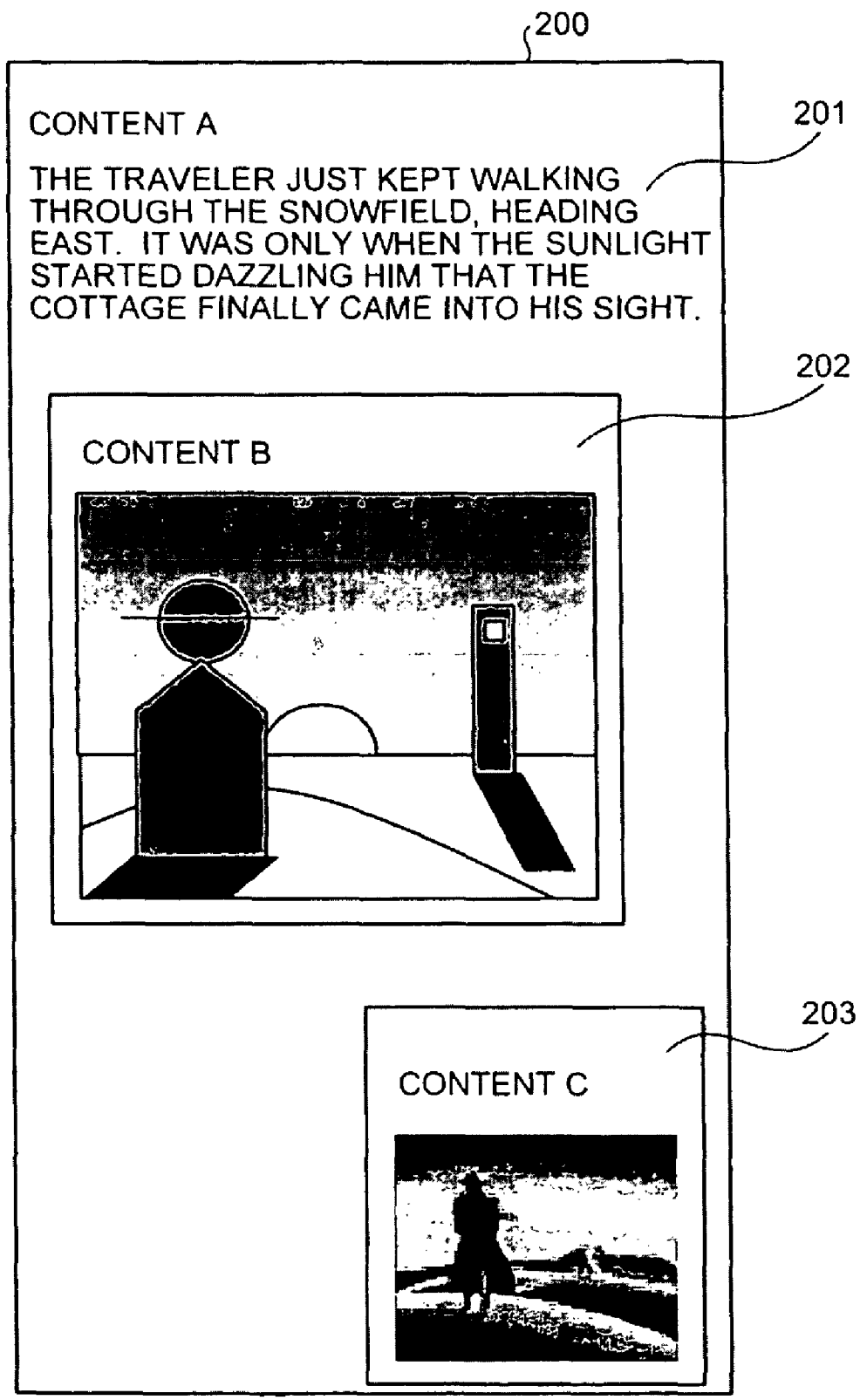
FIG. 3 is a diagram for showing an example of composite contents data.

FIG. 3 is a schematic diagram for showing contents data 200 as an example of the contents data 31. A content data 201 (content A) represents the entire contents data 200, and includes a content data 202 (content B) and a content data 203 (content C) as structural components. More specifically, when the relationship of the content data in the contents data 200 is represented as whole/part, the content data 201 is "whole", while the content data 202 and 203 are "parts". In other words, the content data of the composite contents data have a nesting structure.

Hereinafter, any content data of a level higher than a certain content data is referred to as an "ancestor component", and any content data of a level lower than this content data is referred to as a "descendant component". When the "whole/part" relationship forms multiple levels, any higher-level content data become ancestor components. For example, with respect to the content data 201 illustrated in FIG. 3, the content data 202 and 203 are its descendant components. On the other hand, with respect to the content data 202 or 203, the content data 201 is their ancestor component.

Figure 4:
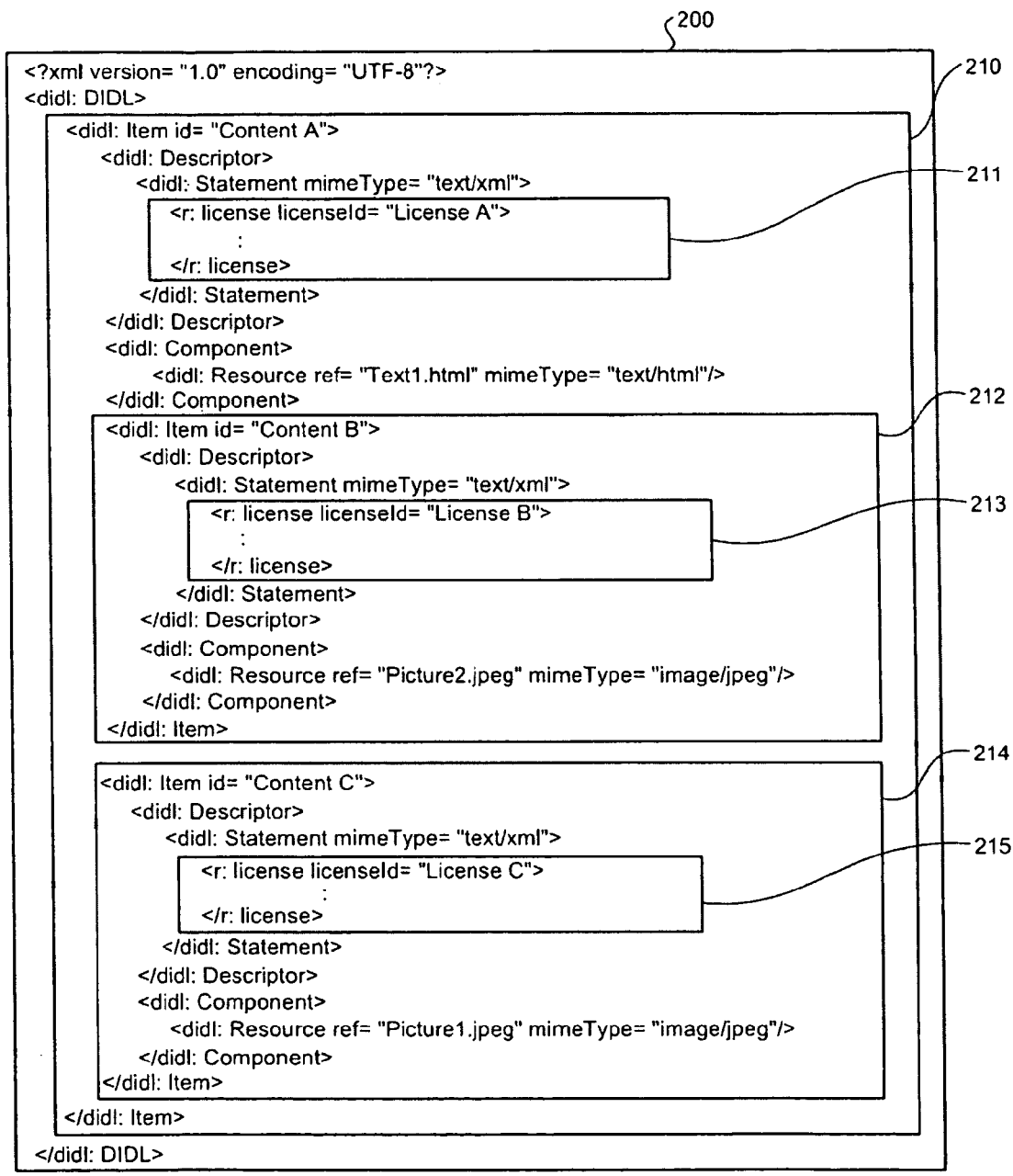
FIG. 4 is a diagram for showing an example of the composite contents data of FIG. 3 described in MPEG-21 format.

FIG. 4 is a diagram for showing an example of the contents data 200 of FIG. 3 described in MPEG-21 format. Data 210 shows descriptions of the content data 201 of FIG. 3. In a similar manner, data 212 shows descriptions of the content data 202, and data 214 shows descriptions of the content data 203. Each data includes a usage rule (211, 213, 215) that defines the usage rule for the corresponding contents. The usage rules 211, 213, and 215 correspond to the usage rules 32. In FIG. 4, the usage rules 32 are indicated as being included individually in the data 210, 212, and 214 corresponding to the contents, but the inclusion of the usage rules 32 is not limited to this manner. For example, the usage rules 32 may be stored in separate files associated with the data 210, 212, and 214.

Figure 5:
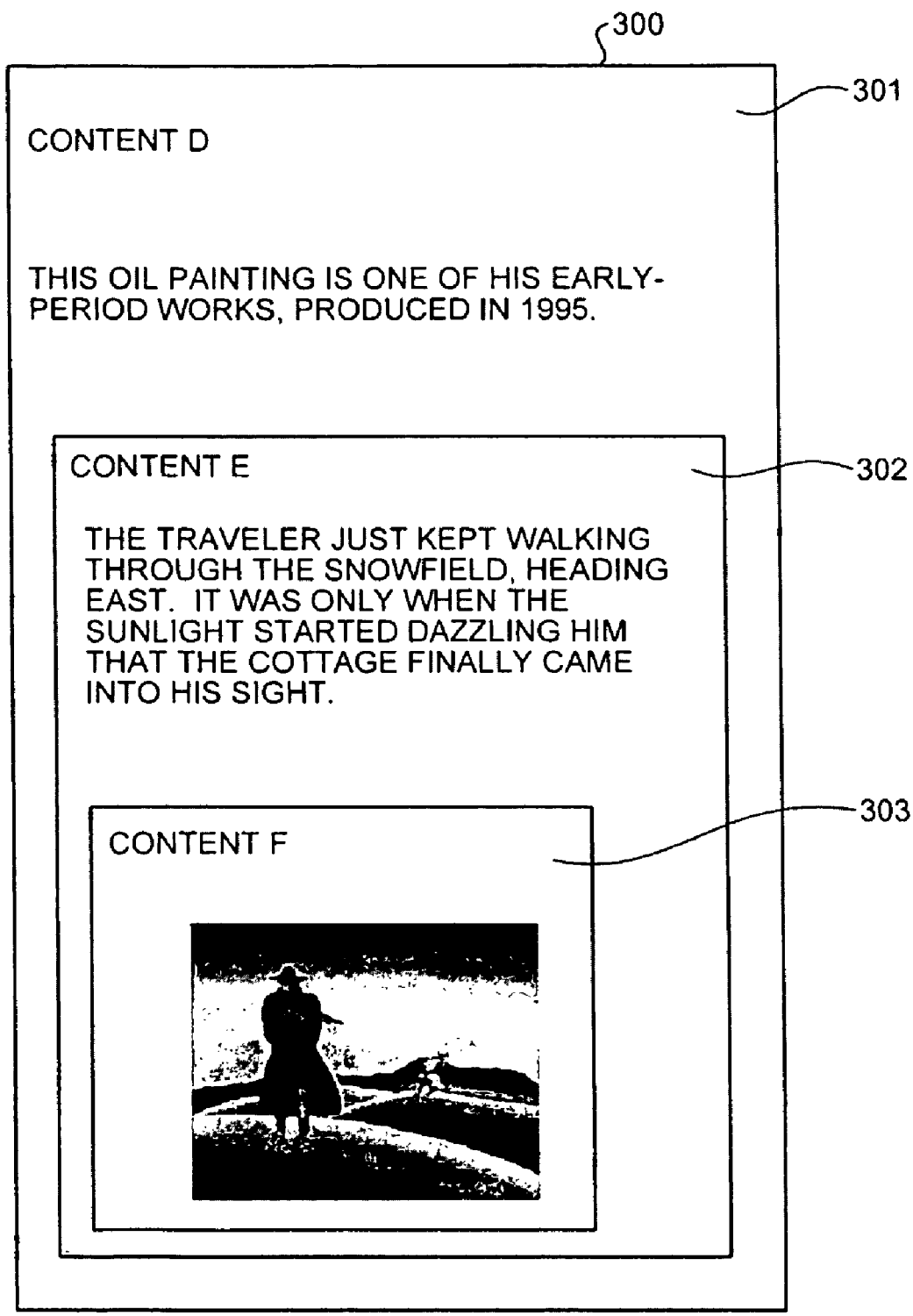
FIG. 5 is a diagram for showing another example of composite contents data.

FIG. 5 is a schematic diagram of contents data 300 for showing another example of the contents data 31. Content data 301 (content D) represents the entire contents data 300, and includes a content data 302 (content E) and a content data 303 (content F) as its structural components. The content data 302 includes content data 303 as its structural component. With reference to the content data 301, the content data 302 and 303 are its descendant components. With reference to the content data 302, the content data 301 is its ancestor component, and the content data 303 is its descendant component. With reference to the content data 303, the content data 301 and 302 are its ancestor components.

Figure 6:
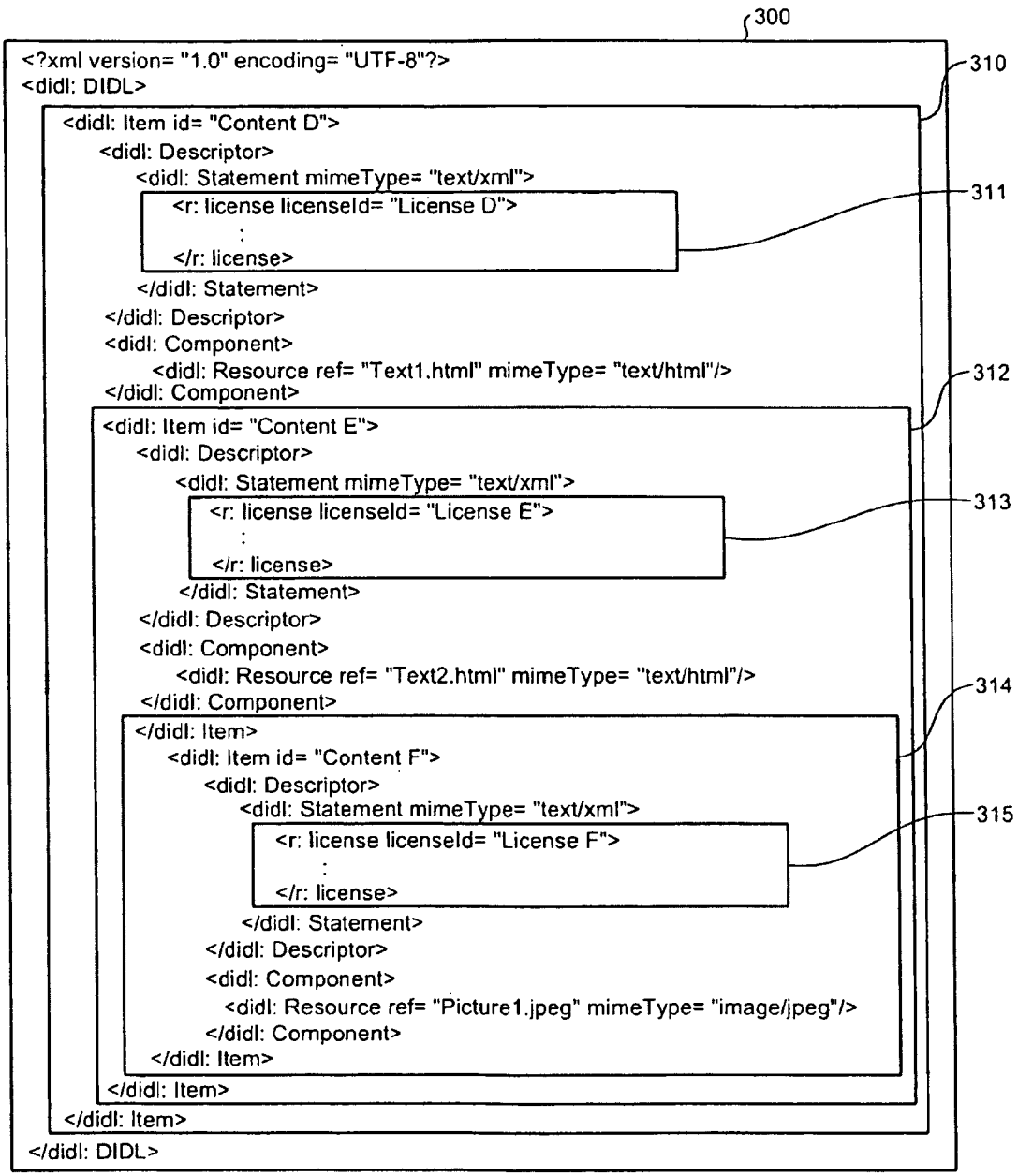
FIG. 6 is a diagram for showing an example of the composite contents data of FIG. 5 described in MPEG-21 format.

FIG. 6 is a diagram for showing an example of the contents data 300 of FIG. 5 described in MPEG-21 format. Data 310 shows descriptions of the content data 301 of FIG. 5. In a similar manner, data 312 shows descriptions of the content data 302, and data 314 shows descriptions of the content data 303. Each of the data includes a usage rule (311, 313, 315) that defines the usage right for the corresponding contents. The usage rules 311, 313, and 315 correspond to the usage rules 32.

Figure 7:
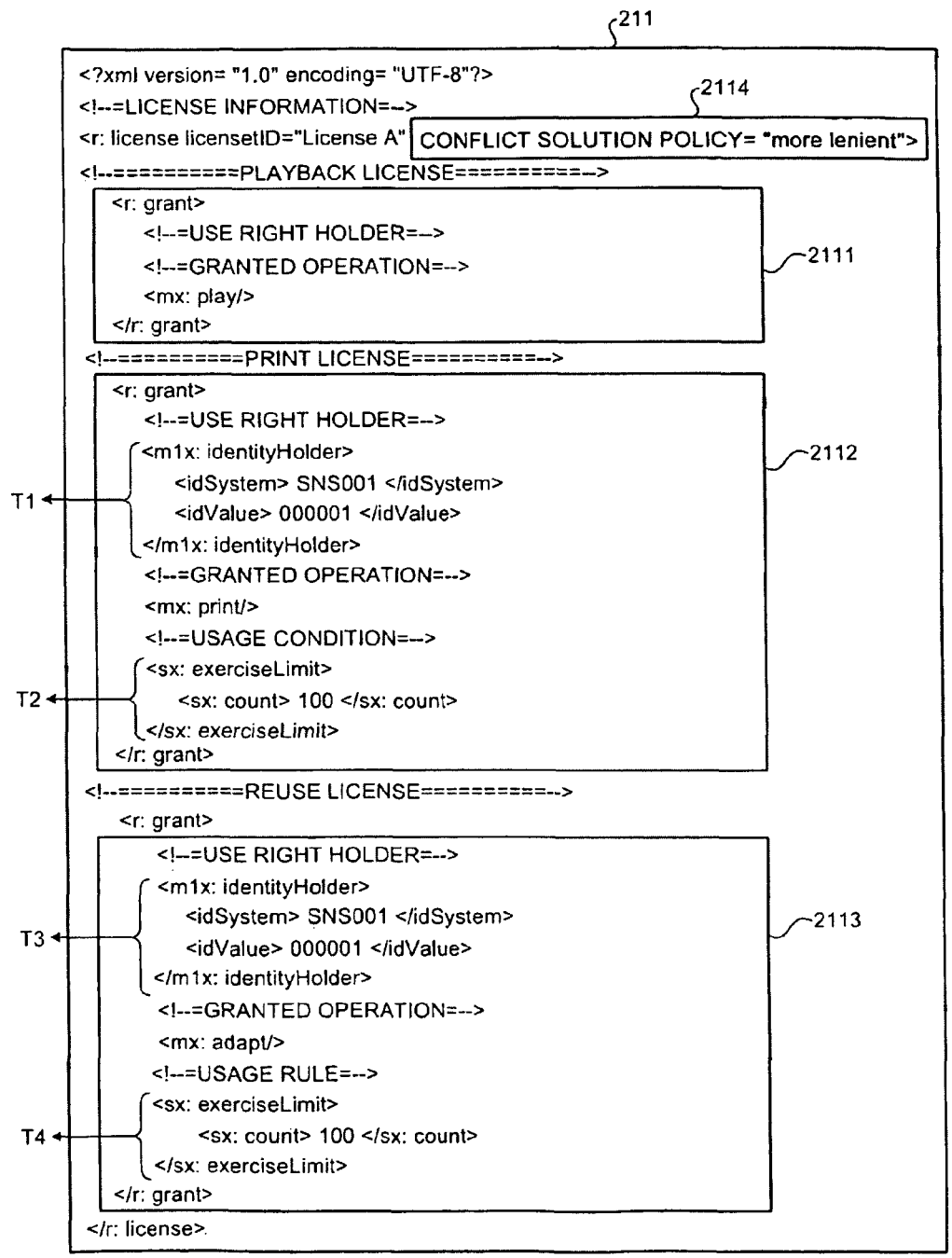
FIG. 7 is a diagram for showing an example of a usage rule.

The usage rules 32 are described below with reference to FIGS. 7 to 9. FIG. 7 is a diagram for showing the usage rule 211 of FIG. 4 described in MPEG-21REL format as an example of the usage rules 32. The usage rule 211 defines usage rules of verifying whether the use is granted or denied for each usage type of the content data 201.

A grant 2111 defines a usage rule for playing back the content data 201. In the example of FIG. 7, the grant 2111 does not specify any usage rule. This indicates that the playback is unconditionally granted.

A grant 2112 defines a usage rule for printing the content data 201. A tag T1 described in the grant 2112 indicates that printing is granted for a user having a membership type "SNS001" and a membership number "000001". A tag T2 indicates that the printing of the content data 201 is permitted up to 100 times (sheets). In other words, the grant 2112 defines, as usage rules, that the user of the membership type "SNS001" and the membership number "000001" is permitted to make prints up to 100 sheets.

A grant 2113 describes a usage rule for adapting the content data 201. A tag T3 in the grant 2113 indicates that the adapting is granted for a user having a membership type "SNS001" and a membership number "000001". A tag T4 indicates that the adapting of the content data 201 is granted up to 100 times (sheets). In other words, the grant 2113 defines, as usage rules, that the user of the membership type "SNS001" and the membership number "000001" is permitted to adapt the content data 201 up to 100 sheets. In the example of FIG. 7, playing back, printing, and adapting are incorporated as usage types, but the usage types are not limited to these. Activities such as broadcasting to the public and remaking may also be included to define the usage rules.

The usage rule 211 further defines a conflict solution policy 2114 (more lenient), which shows how to verify the grant/denial of using the content data (grant determining method) when a conflict arises with other content data. The conflict with other content data means that the grant/denial verification varies in accordance with the usage rules of each content data.

The conflict solution policy 2114 may be "full agreement (most strict)", "lineal-line agreement (strict)", "full descendant-component agreement (less strict)", or "descendant-component agreement (more lenient)".

The "most strict" rule specifies as the grant determining method that, in the case of a conflict arising among content data, the use of the composite contents data that includes a content data designated by the user is totally denied unless all the content data of the composite contents data satisfy the usage rules.

The "strict" rule specifies as the grant determining method that, in the case of a conflict arising among content data, the use of the content data is denied unless the content data designated by the user and all of its ancestor components and descendant components satisfy the usage rules.

The "less strict" rule specifies as the grant determining method that, in the case of a conflict arising among content data, the use of the content data is denied unless the content data designated by the user and all of its descendant components satisfy the usage rules.

The "more lenient" rule specifies as the grant determining method that, in the case of a conflict arising among content data, the use of only content data that satisfy the usage rules are granted among the content data designated by the user and its descendant components.

Figure 8:
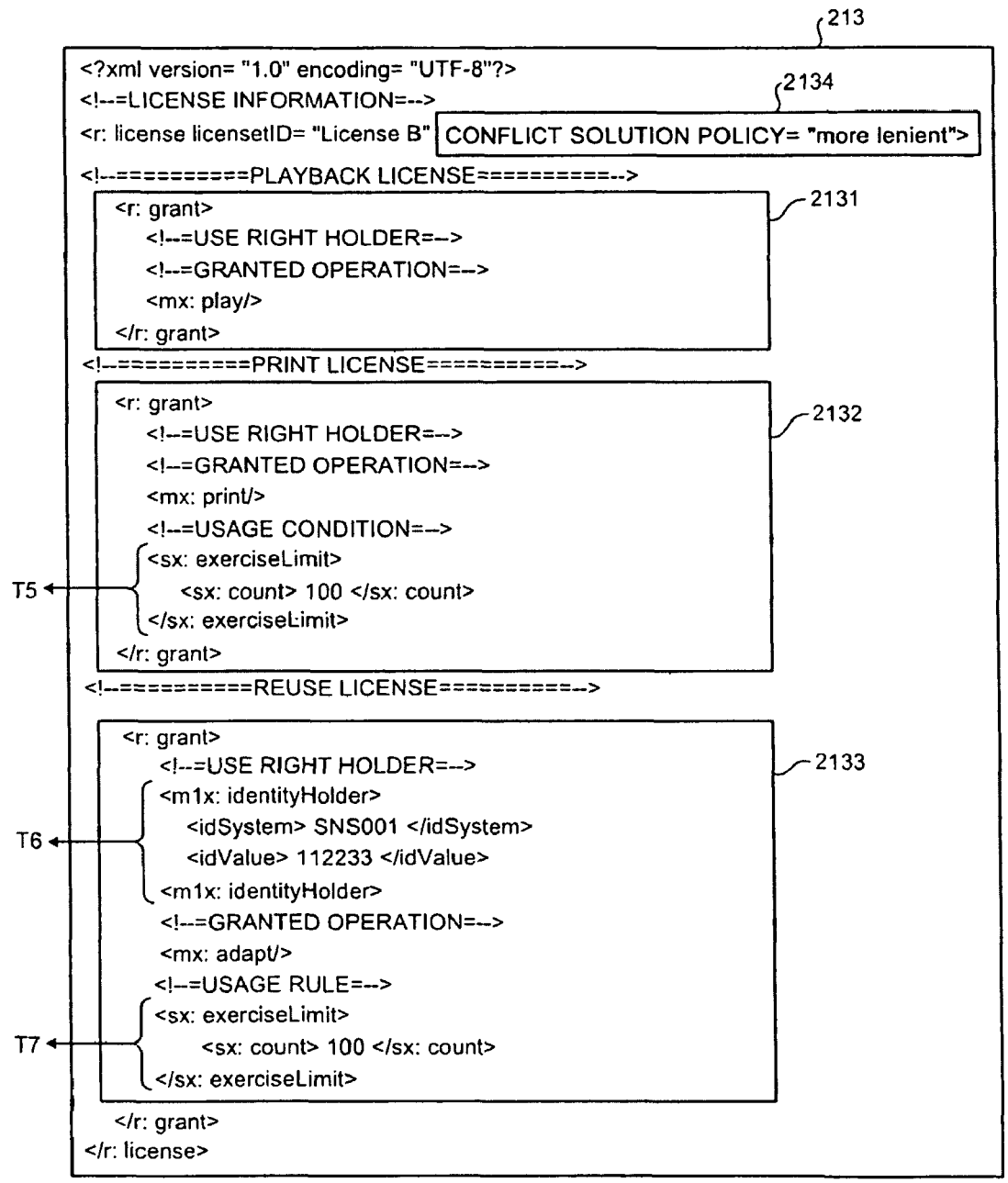
FIG. 8 is a diagram for showing another example of a usage rule.

FIG. 8 is a diagram for showing an example of the usage rule 213 of FIG. 4 described in MPEG-21REL format as one of the usage rules 32. In the same structure as FIG. 7, the usage rule 213 individually defines the usage rules for different usage types of the content data 202.

A grant 2131 defines a usage rule for playing back the content data 202. In the example of FIG. 8, grant 2131 does not specify any usage rule. This indicates that the playback is unconditionally granted.

A grant 2132 defines a usage rule for printing the content data 202. A tag T5 in the grant 2132 indicates that the printing of the content data 202 is permitted up to 100 times (sheets). In other words, the grant 2132 defines the usage rules that printing is permitted for all the users up to 100 sheets.

A grant 2133 defines a usage rule for adapting the content data 202. A tag T6 of the grant 2133 indicates that a user of the membership type "SNS001" and the membership number "112233" is permitted to adapt the content data 202. A tag T7 indicates that the adapting of the content data 202 is permitted up to 100 times (sheets). In other words, the grant 2133 defines the usage rules that the user of the membership type "SNS001" and the membership number "112233" only is permitted to adapt the content data 202 up to 100 sheets.

As shown in FIG. 8, the usage rule 213 further includes a conflict solution policy 2134 (more lenient) to indicate how to solve a conflict when it occurs with other content data.

FIG. 9 is a diagram for showing an example of the usage rule 215 of FIG. 4 described in MPEG-21REL format as one of the usage rules 32. With the same structure as in FIG. 7, the usage rule 215 individually defines usage rules for different usage types of the content data 203.

A grant 2151 defines a usage rule for playing back the content data 203. In the example of FIG. 9, the grant 2151 does not specify any usage rule. This indicates that the playback is unconditionally granted.

A grant 2152 defines a usage rule for printing the content data 203. In the example of FIG. 9, the grant 2152 does not specify any usage rule, and this indicates that the printing is unconditionally granted.

A grant 2153 defines a usage rule for adapting the content data 203. In the example of FIG. 9, the grant 2153 does not specify any usage rule, and this indicates that the adapting is unconditionally granted.

As shown in FIG. 9, the usage rule 215 also describes a conflict solution policy 2154 (strict) that indicates how to solve a conflict with other content data when it arises.

A conflict solution policy is defined for each content data that is included in the contents data 200. The grants discussed above abide by grant elements of a license element defined by the MPEG-21REL. The conflict solution policies for the contents data 300 are not shown in the drawings, but they are individually described in the usage rules prepared for each usage type of content data, in the same manner as the conflict solution policies of the contents data 200.

Figures 10, 11, 12:
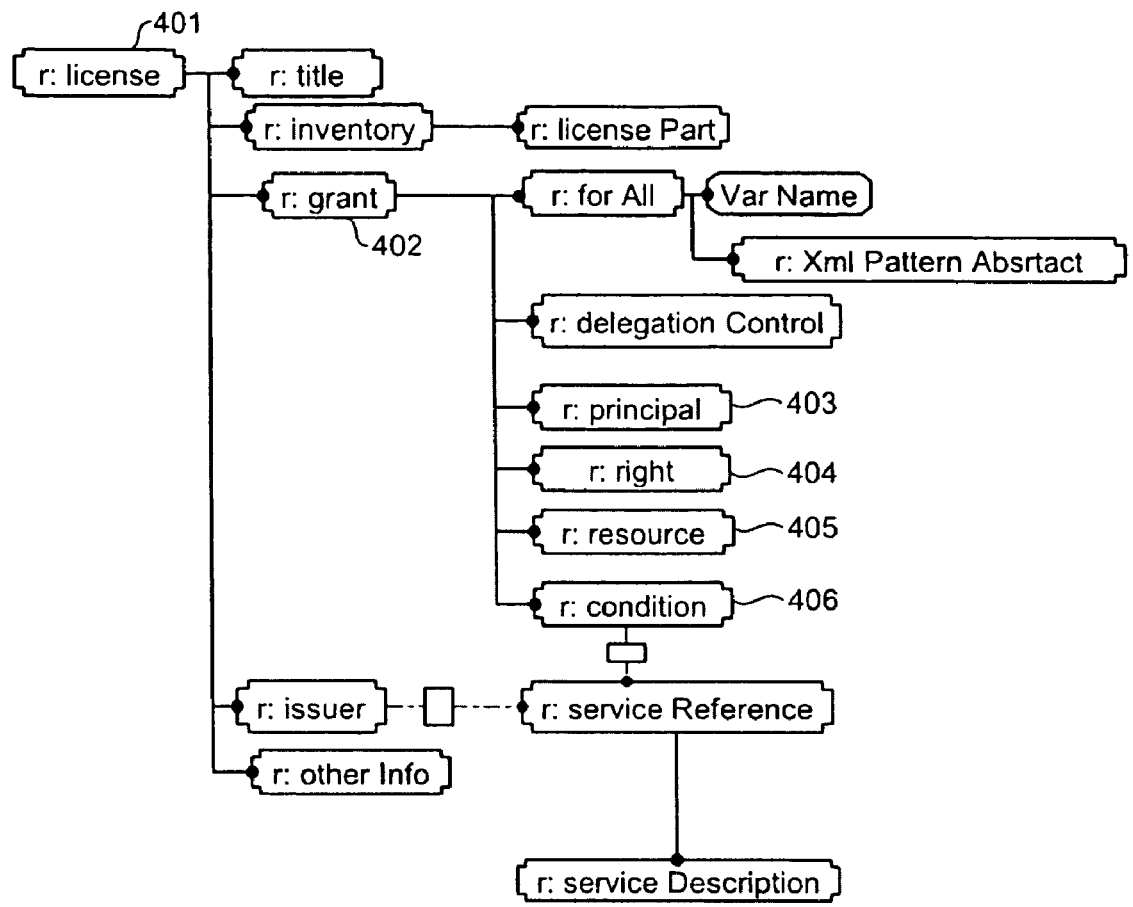
FIG. 10 is a schematic diagram of the structure of MPEG-21REL.
FIG. 11 is a diagram for showing an example of tree-structured data.
FIG. 12 is a diagram for showing an example of individual material verification data.

FIG. 10 is a schematic diagram of the data structure of the MPEG-21REL usage rules. A usage rule is represented as a license element 401. The license element 401 may include multiple grant elements 402 that specifically describe the grants. The grant elements 402 can specify the subject party of the use (principal element 403), an operation (right element 404), the object party of the use (resource element 405), and a condition (condition element 406). By combining these elements, "what activity is granted to whom under what condition to be conducted on what object" can be defined.

With regard to the grant 2112 shown in FIG. 7, for example, the content described in the tag T1 corresponds to the subject party of the use (principal element 403), the type of use "print" corresponds to the operation (right element 404), and the content described in the tag T2 corresponds to the condition (condition element 406). The grant 2112 does not include any description that would correspond to the object party of the use (resource element 405). However, the content data (content A) paired with the usage rule 211 of the grant 2112 corresponds to the object party of the use.

Returning to FIG. 2, the contents displaying/designating unit 21 executes processes in relation to the designation of the contents data 31 that is an operation target and of a specific content data of the contents data 31.

More specifically, when receiving information that is input by the user by way of the operating unit 12 to designate specific contents data 31, the contents displaying/designating unit 21 reads this contents data 31 from the storage unit 17 and displays it on the displaying unit 13.

In addition, the contents displaying/designating unit 21 displays on the displaying unit 13 a screen (such as a GUI) that supports the designation of a specific content data from the content data of the contents data 31 displayed on the displaying unit 13. When information is input by the user by way of the operating unit 12 to designate the specific content data and is received by the contents displaying/designating unit 21, this content data is set to an operation target.

For example, for the contents data 200 in FIG. 3, the user can designate any one of the contents A, B, and C. When the content A is designated, the content A is set to an operation target. When the content A is designated, it means that the contents B and C that are included in the content A are also designated, or in other words, the entire contents data 200 is designated.

The operation/condition designating unit 22 receives various instruction information for the target content data, and sends this instruction information to the individual material verifying unit 24 and the partial-granted contents-data generating/presenting unit 27.

In particular, when the operation/condition designating unit 22 displays on the displaying unit 13 a screen (such as a GUI) to support the designation of an operation that is to be performed onto the target content data and receives information input by the user by way of the operating unit 12 to designate a specific operation, the operation/condition designating unit 22 temporarily stores therein the designated operation. The "operation" represents the type of use of the content data, including activities to be performed by the user onto the content data, such as playing back, printing, adapting, broadcasting to the public, and remaking.

Furthermore, the operation/condition designating unit 22 displays on the displaying unit 13 a screen (such as a GUI) that supports the input of the information such as the membership type and the membership number (hereinafter, "selected usage rule") to be compared with the usage rules defined by the usage rules 32. When receiving a selected usage rule input by the user by way of the operating unit 12, the operation/condition designating unit 22 temporarily stores therein the selected usage rule.

The content structure analyzing unit 23 analyzes the structure of the contents data 31 related to the target content data, and generates tree structure data 41 describing the structure of the target content data and other content data in relation thereto.

FIG. 11 is a diagram for showing an example of the tree structure data 41. This drawing indicates the tree structure data 41 that is generated when the entire contents data 200 of FIG. 3, or in other words, the content data 201 (content A) is determined as an operation target.

As shown in FIG. 11, the relationship of the contents A, B, and C included in the contents data 200 is represented by the structure of tags that define the content data (T8, T9, and T10). More specifically, the tags T9 and T10 that define the contents B and C are described in the tag T8 that defines the content A to indicate that the content A includes the contents B and C. The tree structure data 41 is described in XML format in FIG. 11, but the format of describing the tree structure data 41 is not limited thereto.

The content structure analyzing unit 23 includes the relationship of the target content data and its descendant components in the range of the content data described in the tree structure data 41, but the description is not limited thereto. For example, all the content data of the contents data 31 may be included in the range of the content data, regardless of the target content data.

Moreover, the content structure analyzing unit 23 may be configured to read the usage rule 32 that corresponds to the target content data and determine the range of the tree structure data 41 in accordance with the conflict solution policy included in this usage rule 32.

More specifically, when the conflict solution policy is "most strict", the tree structure data 41 includes all the content data of the contents data 31 in the range of the content data and describes the relationship thereof. When the conflict solution policy is "strict", the tree structure data 41 includes all the lineal-line content data of the target content data, or in other words the target content data, all the ancestor components that have the target content data as a structural component, and all the descendant components of the target content data in the range of the content data, and describes the relationship thereof. When the conflict solution policy is either "less strict" or "more lenient", the tree structure data 41 includes the target content data and its descendant components in the range of the content data, and describes the relationship thereof.

The individual material verifying unit 24 reads the usage rule 32 that corresponds to each of the content data included in the tree structure data 41, and compares the usage rules of the usage rules 32 with the operation and the selected usage rule received by the operation/condition designating unit 22. The individual material verifying unit 24 thereby determines whether the use of each of the content data included in the tree structure data 41 is permitted.

The individual material verifying unit 24 further generates individual material verification data that indicates the verification result as to whether the use of each of the content data included in the tree structure data 41 is permitted. According to the present embodiment, the usage grant verifying result is expressed by Boolean algebra. For example, it is assumed that the usage rules 211, 213, and 215 in the data 210 of FIG. 4 are defined as shown in the usage rules 211, 213, and 215 of FIGS. 7 to 9. When the user of the membership type "SNS001" and the membership number "000001" issues a request of adapting the content A, the individual material verifying unit 24 generates individual material verification data as indicated in FIG. 12, as a grant verification result of the operation.

Based on the grant verification result made on each of the content data included in the individual material verification data, the individual material verifying unit 24 further determines whether a conflict arises among these contents.

In particular, when all the grant verification results of the individual material verification data are "true", the individual material verifying unit 24 determines that there is no conflict among the contents, and thus causes the contents operation executing unit 28 to execute the operation designated by the operation/condition designating unit 22 onto the target content data.

Furthermore, when all the grant verification results of the individual material verification data are "false", the individual material verifying unit 24 determines that there is no conflict among the contents, and causes the reason presenting unit 29 to present all the content data included in the individual material verification data.

Further, when the grant verification results of the content data indicated in the individual material verification data are not uniform, or in other words when the results are different from among the content data, the individual material verifying unit 24 determines that a conflict arises among the content data. Thus, the individual material verifying unit 24 causes the conflict solving unit 25 to solve the conflict among the content data. According to the present embodiment, the verification is made as the occurrence of a conflict when the grant verification results of the content data indicated in the individual material verification data vary from one another, but the verification is not limited to this manner. The verification may be made as the occurrence of a conflict when the grant verification result of an upper content data does not agree with the verification result of a lower content data among the content data included in the individual material verification data.

The conflict solving unit 25 executes a conflict solving process, which will be described later, together with the contents conflict solving unit 26, and solves a conflict among the content data in accordance with the conflict solution policy for each of the content data included in the tree structure data 41.

More specifically, based on the tree structure data 41, the conflict solving unit 25 creates a structure list that records the use grant state of each of the content data included in the tree structure data 41 and a reason list that records the content data that has caused the conflict. The conflict solving unit 25 thereby causes the contents conflict solving unit 26 to sequentially execute a process of solving the conflict among the contents (contents conflict solving process) onto the contents included in this structure list.

In the initial state, the structure list describes the relationship of the target content data and its descendant components that are included in the tree structure data 41. For example, for the tree structure data 41 indicated in FIG. 11, the conflict solving unit 25 creates a structure list describing "A(B, C)". The description "A(B, C)" means that the content data in the parentheses (contents B and C) are the components of the content data placed in front of the parentheses (content A). The description style of the structure list, however, is not limited thereto. The reason list does not have any information described in the initial state.

The contents conflict solving unit 26 refers to the usage rule 32 that corresponds to the content data that is to be processed, and reads the conflict solution policy from the usage rule 32. The contents conflict solving unit 26 determines whether to permit or deny the use of each content data included in the structure list in accordance with the type of the conflict solution policy that is read out, and writes the verification result into the structure list. Further, the contents conflict solving unit 26 adds the content data that has caused the conflict among the content data to the reason list. The verification on the grant/denial of the use of a content data will be discussed later.

During the conflict solving process that will be described later, when a conflict occurs among the conflict solution policies (hereinafter, "policy conflict") in association with the solution of the conflict among the content data, the conflict solving unit 25 updates the structure list and the reason list in accordance with a predetermined policy to solve the policy conflict.

The "policy conflict" means that, when different conflict solution policies are set for an ancestor component content and for its descendant component content, the final verification result depends on which conflict solution policy is given a higher priority. The "policy priority order" is setting information that is preset and prestored in the ROM 14 or the storage unit 17 of the content processing apparatus 100, and defines the method of creating (updating) the structure list and the reason list when a policy conflict occurs. In particular, "entirety priority" adopting the conflict solution policy of the content data used as the entirety, or "component priority" adopting the conflict solution policy of a content data as a part is defined.

The "entirety priority" is a method of creating/updating the structure list and the reason list when a policy conflict occurs, by preferentially adopting the conflict solution policy for an upper content data, or in other words the conflict solution policy for the content data used as the entirety from among the conflict solution policies for the content data included in the structure list. This method is suitable especially for an object that generally exhibits creativity throughout the contents data 31 such as an encyclopedia.

The "component priority" is a method creating/updating the structure list and the reason list when a policy conflict occurs, by preferably adopting the conflict solution policy for a lower content data, or in other words the conflict solution policy for a target content data used as a material from among the conflict solution policies for the content data included in the structure list. This method is suitable especially for an object that exhibits creativity in content data that serve as parts of the contents data.

Further, based on information of the grant/denial of the use of each content data the written in the structure list, the conflict solving unit 25 determines whether part of the content data included in the structure list can be used. Based on this verification result, when the use of all the content data are denied, the conflict solving unit 25 causes the reason presenting unit 29 to display the content data written in the reason list.

When it is determined that part or all of the content data of the tree structure data 41 can be used, the conflict solving unit 25 outputs the created structure list and reason list to the partial-granted contents-data generating/presenting unit 27.

The partial-granted contents-data generating/presenting unit 27 extracts the granted content data that are on the structure list from the content data of the contents data 31. The partial-granted contents-data generating/presenting unit 27 thereby generates new contents data (partial granted contents data 42), and displays it on the displaying unit 13.

In accordance with the reason list input by the conflict solving unit 25, the partial-granted contents-data generating/presenting unit 27 presents on the reason presenting unit 29 the names of the content data (content IDs) that are on the reason list.

When receiving information indicating the execution of the operation from the operation/condition designating unit 22, the partial-granted contents-data generating/presenting unit 27 causes the contents operation executing unit 28 to execute the operation designated by the operation/condition designating unit 22 onto the partial granted contents data 42.

Under the control of the individual material verifying unit 24, the contents operation executing unit 28 executes the operation designated by the operation/condition designating unit 22 onto the content data designated by the contents displaying/designating unit 21. In addition, the contents operation executing unit 28 executes, under the control of the partial-granted contents-data generating/presenting unit 27, the operation designated by the operation/condition designating unit 22 onto the partial granted contents data 42 generated by the partial-granted contents-data generating/presenting unit 27.

Under the control of the individual material verifying unit 24, the reason presenting unit 29 displays the name of the content data (content ID) for which the grant verification result included in the individual material verification data indicates "false", onto the displaying unit 13. The reason presenting unit 29 also displays, under the control of the conflict solving unit 25 or the partial-granted contents-data generating/presenting unit 27, the name of the content data described on the reason list onto the displaying unit 13.

Figure 13:
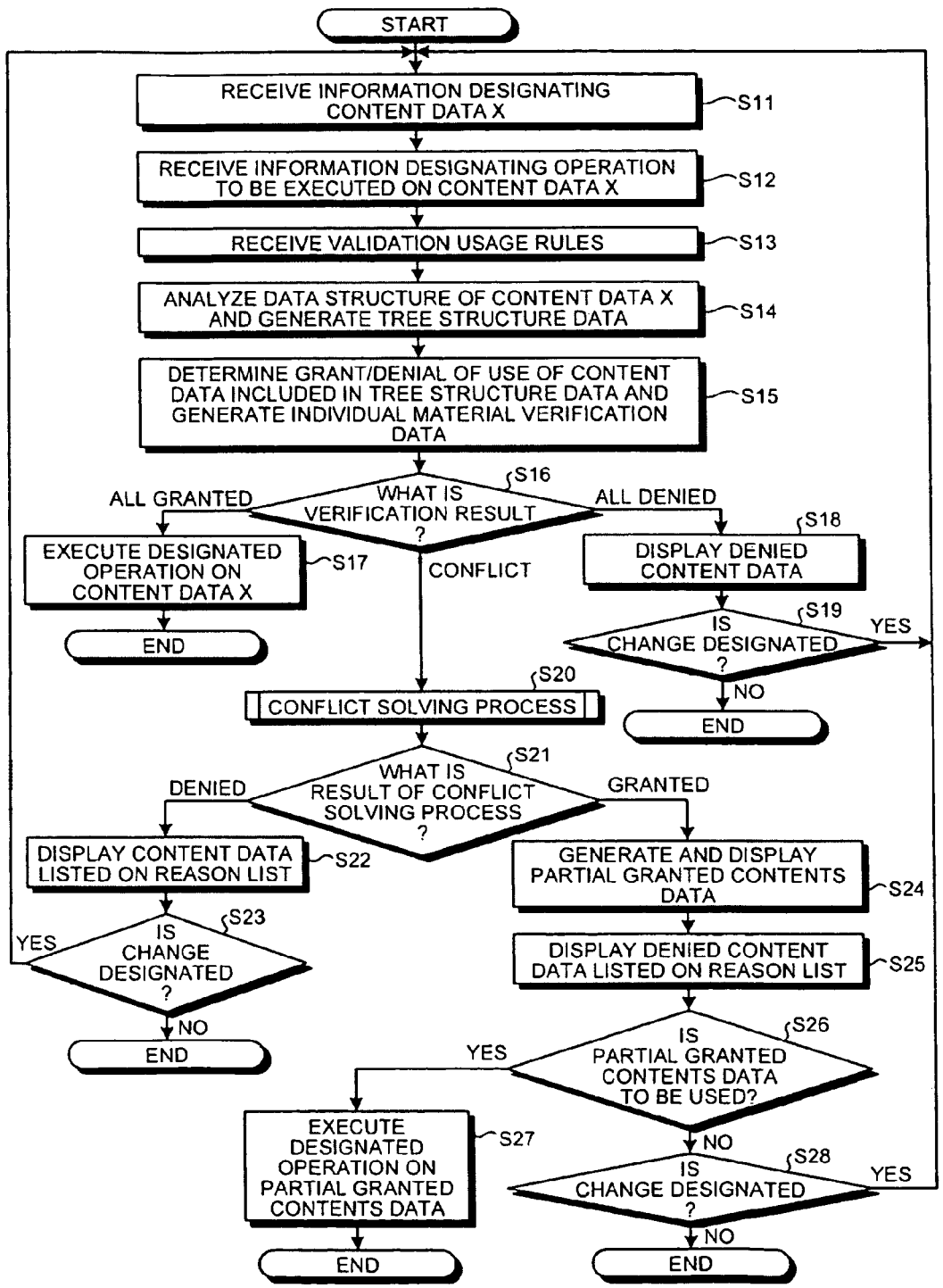
FIG. 13 is a flowchart of the entire process.

The operation of the content processing apparatus 100 is explained below. FIG. 13 is a flowchart of the entire process of the content processing apparatus 100. First, when displaying the contents data 31 designated by the user on the displaying unit 13, the contents displaying/designating unit 21 receives information designating a specific content data from among the content data included in the contents data 31 (step S11). Hereinafter, the target content data designated at step S11 is referred to as "content data X".

Thereafter, the operation/condition designating unit 22 receives information designating the operation that is to be executed on the content data X designated at step S11 (step S12), and also receives validation usage rules such as a membership type and a membership number (step S13).

The content structure analyzing unit 23 analyzes the data structure of the content data X, and generates the tree structure data 41 to show the relationship of the content data X and its descendant components (step S14).

The individual material verifying unit 24 compares the usage rule of the usage rule 32 that corresponds to a content data included in the tree structure data 41 with the operation and the selected usage rule received at steps S12 and S13 for each of the content data in the tree structure data 41. The individual material verifying unit 24 thereby generates individual material verification data for each of the content data (step S15).

Based on the grant verification result included in the individual material verification data for each content data, the individual material verifying unit 24 determines whether a conflict occurs among the content data (step S16). When all the grant verification results are "true", the individual material verifying unit 24 determines that there is no conflict among the content data (step S16; all granted), and causes the contents operation executing unit 28 to execute the operation designated at step S12 onto the content data X (step S17). The process is then terminated.

When all the verification results obtained at step S16 are "false", the individual material verifying unit 24 determines that there is no conflict among the content data (step S16; all denied), and displays the names of the content data (content IDs) included in the tree structure data 41 and the like on the reason presenting unit 29 (step S18).

After step S18, when the operation/condition designating unit 22 receives information indicating a change of the content data X or the selected usage rule (Yes at step S19), the system goes back to step S11. After step S18, when the operation/condition designating unit 22 receives information indicating the termination of the process (No at step S19), the process is terminated.

When the verification results obtained at step S16 are different from among the content data, the individual material verifying unit 24 determines that a conflict occurs among the content data (step S16; conflict), and causes the conflict solving unit 25 to execute the conflict solving process to solve this conflict (step S20). The conflict solving process performed at step S20 is explained with reference to FIG. 14.

Figure 14:
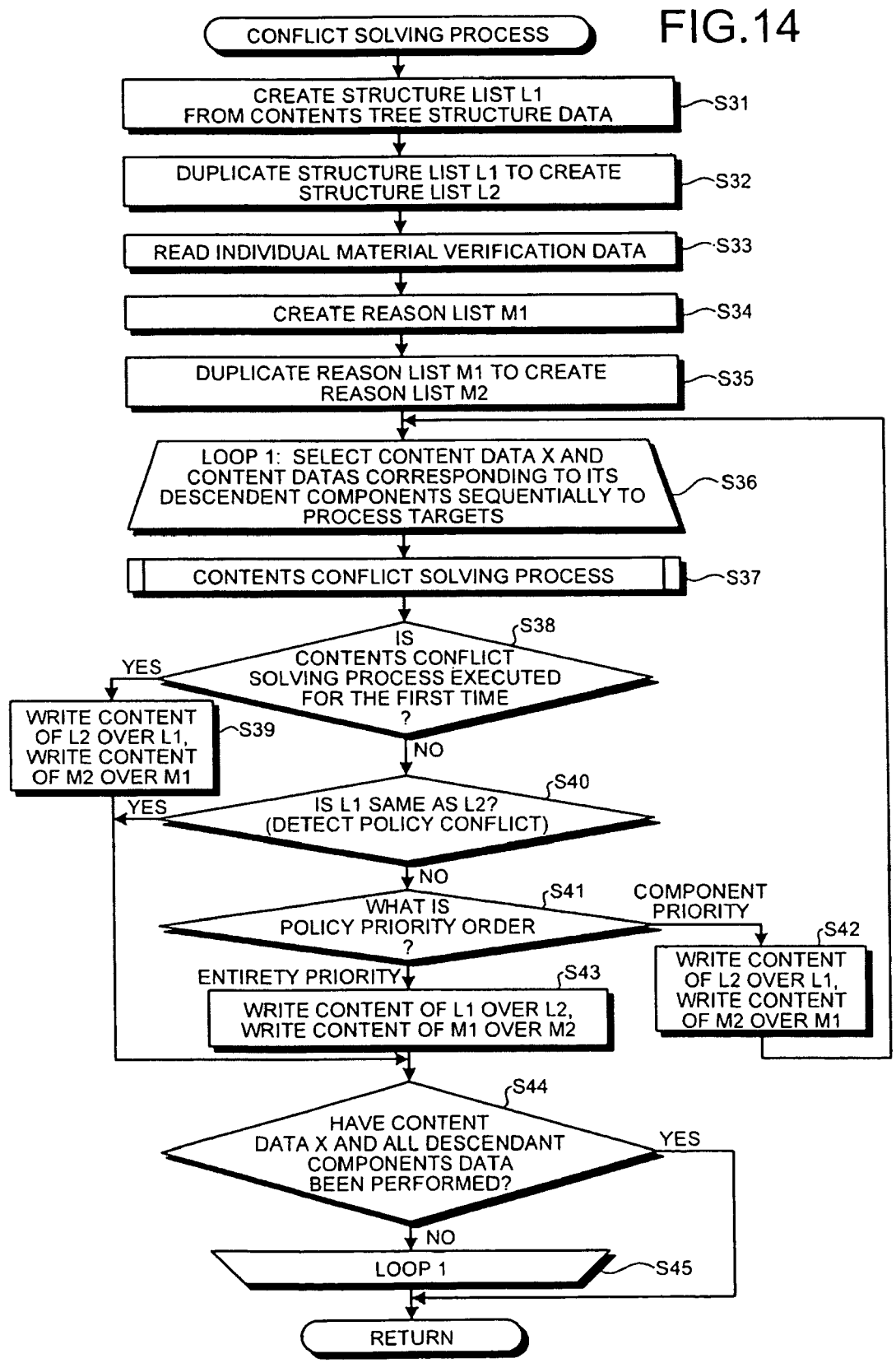
FIG. 14 is a flowchart of a conflict solving process.

FIG. 14 is a flowchart of the conflict solving process. First, the conflict solving unit 25 executes the processes at steps S31 through S35 as preprocessing. At step S31, a structure list is created based on the tree structure data 41 generated at step S14 to record the use grant state of each of the contents included in the tree structure data 41. At step S32, a copy of the structure list is created. Hereinafter, the structure list created at step S31 is referred to as "structure list L1", and the structure list created at step S32 is referred to as "structure list L2".

At step S33, the individual material verification data generated at step S15 is read to use in the contents conflict solving process, which will be described later. At step S34, a reason list is created to record the content data that has caused the policy conflict. At step S35, a copy of the reason list is created. Hereinafter, the reason list created at step S34 is referred to as "reason list M1", and the reason list created at step S35 is referred to "reason list M2".

Thereafter, the conflict solving unit 25 selects the content data X and the content data that are the descendant components of the content data X, as targets of the process from the content data included in the tree structure data 41 (step S36), and causes the contents conflict solving unit 26 to execute the contents conflict solving process onto the target content data (step S37). The content data determined at step S36 as targets of the process are referred to as "content data Y". The order of the target content data to be processed does not have to be specifically defined. It is preferable, however, that the process be performed sequentially from the upper content data to the lower content data.

Figure 15A:
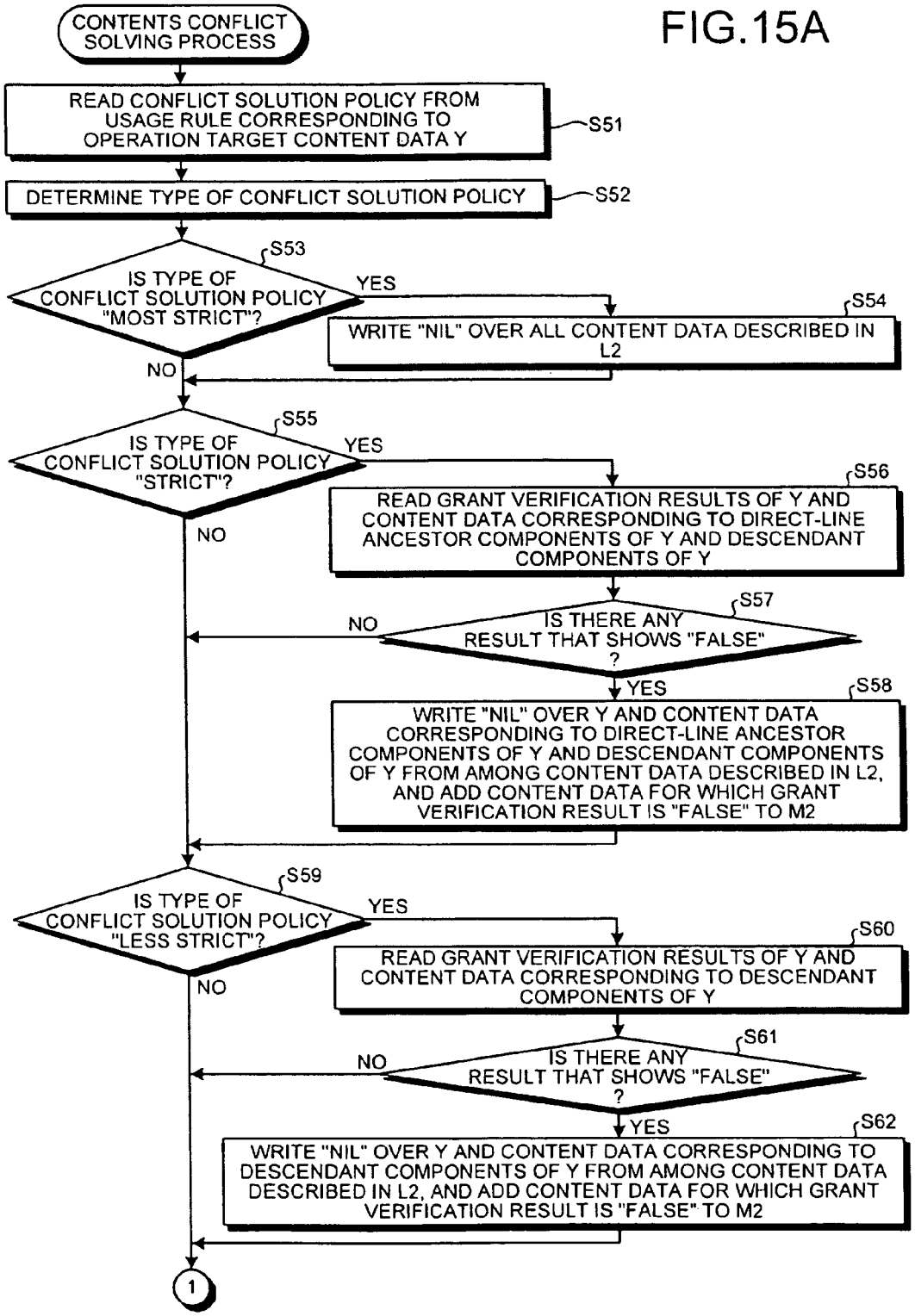
FIGS. 15A and 15B are flowcharts of a contents conflict solving process.
Figure 15B:
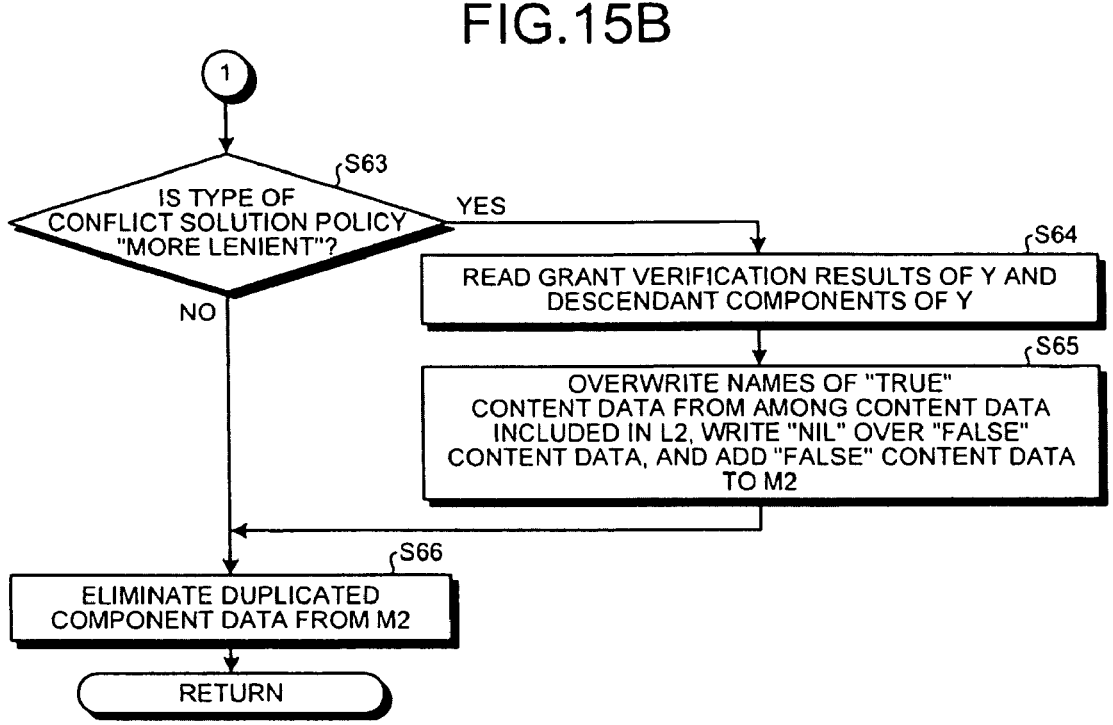

FIGS. 15A and 15B are flowcharts of the contents conflict solving process performed at step S37. First, the contents conflict solving unit 26 reads a conflict solution policy from the usage rule 32 corresponding to the target content data Y (step S51), and determines the type of the policy (step S52).

When it is determined at step S52 that the conflict solution policy is "most strict" (Yes at step S53), because at least one negative result of the grant verification is included in the individual material verification data, the contents conflict solving unit 26 writes "nil", which means a denial of use, over all of the content data described on the structure list L2 and adds the target content data Y to the reason list M2 (step S54). When the conflict solution policy is not "most strict" (No at step S53), or after the process at step S54 is executed, the system proceeds to step S55.

When it is determined at step S55 that the conflict solution policy is "strict" (Yes at step S55), the contents conflict solving unit 26 identifies the target content data Y and the content data corresponding to its lineal-line ancestor components and lineal-line descendant components of the content data Y, in accordance with the tree structure data 41. Then, the contents conflict solving unit 26 reads the grant verification results for these content data from the individual material verification data (step S56).

The contents conflict solving unit 26 determines whether the grant verification results read out at step S56 includes any result that shows "false" (step S57). When there is a "false" result (Yes at step S57), the contents conflict solving unit 26 writes "nil", which indicates a denial of the use, over the content data Y and the content data corresponding to the lineal-line ancestor components and descendant components of the content data Y selected from the content data described on the structure list L2. Then, the contents conflict solving unit 26 adds the content data having the grant verification result being "false" to the reason list M2 (step S58). When it is not determined that the conflict solution policy is "strict" (No at step S55), when it is determined at step S57 that there is no content having the grant verification result being "false" (No at step S57), or after the process is executed at step S58, the system proceeds to step S59.

When it is determined at step S59 that the conflict solution policy is "less strict" (Yes at step S59), the contents conflict solving unit 26 identifies the content data Y and the content data corresponding to the descendant components of the content data Y, in accordance with the tree structure data 41, and reads the grant verification results of these content data from the individual material verification data (step S60).

Thereafter, the contents conflict solving unit 26 determines whether the grant verification results read out at step S60 include any result showing "false" (step S61). When it is determined that there is any result showing "false" (Yes at step S61), the contents conflict solving unit 26 writes "nil", which indicates a denial of use, over the content data Y and the content data corresponding to its descendant components from among the content data described in the structure list L2. Then, the contents conflict solving unit 26 adds the content data having the grant verification result being "false" to the reason list M2 (step S62). When it is determined that the conflict solution policy is not "less strict" (No at step S59), when it is determined at step S61 that there is no content data whose grant verification result is "false" (No at step S61), or after the process is performed at step S62, the system proceeds to step S63.

When it is determined at step S63 that the conflict solution policy is "more lenient" (Yes at step S63), the contents conflict solving unit 26 identifies the content data Y and its descendant components in accordance with the tree structure data 41. Then, the contents conflict solving unit 26 reads the grant verification results of these content data from the individual material verification data (step S64).

For the content data whose grant verification result read out at step S64 is "true" from among the content data included in the structure list L2, the contents conflict solving unit 26 overwrites the names of those content data. For the content data whose grant verification result is "false", the contents conflict solving unit 26 overwrites "nil" indicating a denial of use, and adds these content data to the reason list M2 (step S65). When it is not determined that the conflict solution policy is "more lenient" (No at step S63), or after the process is executed at step S64, the system proceeds to step S66.

At step S66, the contents conflict solving unit 26 eliminates duplicated content data from the content data stored on the reason list M2 (step S66), and outputs the structure list L2 and the reason list M2 as return values to the conflict solving unit 25.

Returning to FIG. 14, the conflict solving unit 25 determines whether the contents conflict solving process at step S37 is executed for the first time (step S38). When it is determined that the contents conflict solving process at step S37 is executed for the first time (Yes at step S38), no conflict occurs among the policies. The conflict solving unit 25 therefore writes the content of the structure list L2 over the structure list L1 (step S39), and the system proceeds to step S44.

On the other hand, it is determined at step S38 that the contents conflict solving process at step S37 has been executed more than twice (No at step S38), there is a possibility of a policy conflict. Thus, the conflict solving unit 25 compares the structure list L1 with the structure list L2 to determine whether the two lists are the same (step S40).

When it is determined at step S40 that the structure list L1 and the structure list L2 are the same (Yes at step S40), the conflict solving unit 25 determines that there is no policy conflict, and the system proceeds to step S44. On the other hand, when it is determined at step S40 that the structure list L1 is different from the structure list L2 (No at step S40), the conflict solving unit 25 determines whether the policy priority order stored in the storage unit 17 is "component priority" or "entirety priority" (step S41).

When it is determined at step S41 that the policy priority order is "component priority" ("component priority" at step S41), the conflict solving unit 25 writes the content of the structure list L2 over the structure list L1 and also writes the content of the reason list M2 over the reason list M1 (step S42). Then, the system goes back to step S35.

When it is determined at step S41 that the policy priority order is "entirety priority" ("entirety priority" at step S41), the conflict solving unit 25 writes the content of the structure list L1 over the structure list L2, and also writes the content of the reason list M1 over the reason list M2 (step S43). Then, the system proceeds to step S44.

Thereafter, the conflict solving unit 25 determines whether the processes at steps S37 through S43 have been performed on all of the content data X and the content data that are the descendant components of the content data X (step S44). When it is determined that there is any unprocessed content data (No at step S44), the system moves to step S45 at the end of the loop, which brings the system back to step S36. In this manner, the unprocessed content data becomes a target of the process.

On the other hand, when it is determined at step S44 that all of the content data X and the content data that are the descendant components of the content data X have been processed (Yes at step S44), the system proceeds to step S21 in FIG. 13.

The operation of the conflict solving process (contents conflict solving process) is explained below with reference to FIGS. 16 to 63. FIGS. 16 to 39 are diagrams for showing the results of the conflict solving process performed on the example case of FIG. 3, and FIGS. 40 to 63 are diagrams for showing the results of the conflict solving process performed on the example case of FIG. 5.

In FIGS. 16 to 63, the results of the cases where the policy priority order is "component priority" are indicated. In these drawings, "r" denotes the operation and the usage rule designated by the user at steps S12 and S13. "R(x)" denotes a set of grants described in the usage rule 32 that corresponds to the content data X. "R(x)@P" denotes the conflict solution policy of R(x), where "P=s" is "strict", and "P=l" is "more lenient". "r∈R(x)" denotes a grant verification result, indicating whether "r" satisfies any of the components of R(x). When "r" satisfies, "T" (true) is entered, and when it does not, "F" (false) is entered.

In FIG. 16, the result of granting the use in response to the user's request of select(A, r) is indicated when R(A)@P=s, R(B)@P=s, and R(C)@P=s are set for the content data 201 (content A), the content data 202 (content B), and the content data 203 (content C) of FIG. 3, respectively. The request select(A, r) means that the user designates the content data 201 (content A) at step S11 and "r" is designated at steps S12 and S13.

In FIG. 16, the grant verification results for r∈R(A) are entered in field F1, the grant verification results for r∈R(B) are entered in field F2, and the grant verification results for r∈R (C) are entered in field F3, respectively. In this table, r∈R(A)= T, r∈R(B)=T, and r∈R(C)=T indicate the state of "all granted" at step S16 of the verifying process. In addition, r∈R(A)=F, r∈R(B)=F, r∈R(C)=F indicate the state of "all denied" at step S16 of the verifying process.

In field F4, the structure list L2, which is the final product of the conflict solving process is entered. In this table, "A(B, C)" indicates that the contents A, B, and C are available as the partial granted contents data 42, and that the contents B and C are components of the content A. "Deny" means that none of the content data can be used, which is the same as the state of "nil(nil, nil)". In other words, the structure list L2 shows information regarding the structure of the content data (structural information) that are finally granted as a result of the conflict solving process. The structural information of the content data is not limited to the form of the structure list L2. Any information associating the grant state of each content data with the structure of the content data can be adopted. For example, the grant state may be recorded for each content data included in the tree structure data 41 as the structural information. In field F5, the reason list M2 is entered as the final product of the conflict solving process. The "nil" state in the field F5 indicates that nothing is on the reason list M2.

As shown in FIG. 16, various final verification results are obtained from different combinations of the grant verification results for r∈R(A), r∈R(B), and r∈R(C). The fields F1 to F5 are incorporated in FIGS. 17 to 39 in the same manner.

In FIG. 17, the results of granting the use in response to the user's request of "select(A, r)" are indicated when R(A) @P=s, R(B)@P=s, and R(C)@P=l are set for the content data 201 (content A), the content data 202 (content B), and the content data 203 (content C) of FIG. 3, respectively.

In FIG. 18, the results of granting the use in response to the user's request of "select(A, r)" are indicated when R(A)@P=s, R(B)@P=l, and R(C)@P=s are set for the content data 201 (content A), the content data 202 (content B), and the content data 203 (content C) of FIG. 3, respectively.

In FIG. 19, the results of granting the use in response to the user's request of "select(A, r)" are indicated when R(A)@P=s, R(B)@P=l, and R(C)@P=l are set for the content data 201 (content A), the content data 202 (content B), and the content data 203 (content C) of FIG. 3, respectively.

In FIG. 20, the results of granting the use in response to the user's request of "select(A, r)" are indicated when R(A)@P=l, R(B)@P=s, and R(C)@P=s are set for the content data 201 (content A), the content data 202 (content B), and the content data 203 (content C) of FIG. 3, respectively. In the field F4, "nil(B, nil)" denotes that only the content B is available as the partial granted contents data 42. "nil(nil, C)" denotes that only the content C is available as the partial granted contents data 42.

In FIG. 21, the results of granting the use in response to the user's request of "select(A, r)" are indicated when R(A)@P=l, R(B)@P=s, and R(C)@P=l are set for the content data 201 (content A), the content data 202 (content B), and the content data 203 (content C) of FIG. 3, respectively. In the field F4, "A(B, nil)" denotes that the contents A and B are available as the partial granted contents data 42, and that the content B is a component of the content A.

In FIG. 22, the results of granting the use in response to the user's request of "select(A, r)" are indicated when R(A)@P=l, R(B)@P=l, and R(C)@P=s are set for the content data 201 (content A), the content data 202 (content B), and the content data 203 (content C) of FIG. 3, respectively. In the field F4, "A(nil, C)" denotes that the contents A and C are available as the partial granted contents data 42, and that the content C is a component of the content A.

In FIG. 23, the results of granting the use in response to the user's request of "select(A, r)" are indicated when R(A)@P=l, R(B)@P=l, and R(C)@P=l are set for the content data 201 (content A), the content data 202 (content B), and the content data 203 (content C) of FIG. 3, respectively. In the field F4, "A(nil, nil)" denotes that only the content A is available as the partial granted contents data 42.

In FIG. 24, the results of granting the use in response to the user's request of "select(B, r)" are indicated when R(A)@P=s, R(B)@P=s, and R(C)@P=s are set for the content data 201 (content A), the content data 202 (content B), and the content data 203 (content C) of FIG. 3, respectively. In the field F4, "B" denotes that the content B is available as the partial granted contents data 42.

In FIG. 25, the results of granting the use in response to the user's request of "select(B, r)" are indicated when R(A)@P=s, R(B)@P=s, and R(C)@P=l are set for the content data 201 (content A), the content data 202 (content B), and the content data 203 (content C) of FIG. 3, respectively.

In FIG. 26, the results of granting the use in response to the user's request of "select(B, r)" are indicated when R(A)@P=s, R(B)@P=l, and R(C)@P=s are set for the content data 201 (content A), the content data 202 (content B), and the content data 203 (content C) of FIG. 3, respectively.

In FIG. 27, the results of granting the use in response to the user's request of "select(B, r)" are indicated when R(A)@P=s, R(B)@P=l, and R(C)@P=l are set for the content data 201 (content A), the content data 202 (content B), and the content data 203 (content C) of FIG. 3, respectively.

In FIG. 28, the results of granting the use in response to the user's request of "select(B, r)" are indicated when R(A)@P=l, R(B)@P=s, and R(C)@P=s are set for the content data 201 (content A), the content data 202 (content B), and the content data 203 (content C) of FIG. 3, respectively.

In FIG. 29, the results of granting the use in response to the user's request of "select(B, r)" are indicated when R(A)@P=l, R(B)@P=s, and R(C)@P=l are set for the content data 201 (content A), the content data 202 (content B), and the content data 203 (content C) of FIG. 3, respectively.

In FIG. 30, the results of granting the use in response to the user's request of "select(B, r)" are indicated when R(A)@P=l, R(B)@P=l, and R(C)@P=s are set for the content data 201 (content A), the content data 202 (content B), and the content data 203 (content C) of FIG. 3, respectively.

In FIG. 31, the results of granting the use in response to the user's request of "select(B, r)" are indicated when R(A)@P=l, R(B)@P=l, and R(C)@P=l are set for the content data 201 (content A), the content data 202 (content B), and the content data 203 (content C) of FIG. 3, respectively.

In FIG. 32, the results of granting the use in response to the user's request of "select(C, r)" are indicated when R(A)@P=s, R(B)@P=s, and R(C)@P=s are set for the content data 201 (content A), the content data 202 (content B), and the content data 203 (content C) of FIG. 3, respectively. In field F4, "C" denotes that the content C is available as the partial granted contents data 42.

In FIG. 33, the results of granting the use in response to the user's request of "select(C, r)" are indicated when R(A)@P=s, R(B)@P=s, and R(C)@P=l are set for the content data 201 (content A), the content data 202 (content B), and the content data 203 (content C) of FIG. 3, respectively.

In FIG. 34, the results of granting the use in response to the user's request of "select(C, r)" are indicated when R(A)@P=s, R(B)@P=l, and R(C)@P=s are set for the content data 201 (content A), the content data 202 (content B), and the content data 203 (content C) of FIG. 3, respectively.

In FIG. 35, the results of granting the use in response to the user's request of "select(C, r)" are indicated when R(A)@P=s, R(B)@P=l, and R(C)@P=l are set for the content data 201 (content A), the content data 202 (content B), and the content data 203 (content C) of FIG. 3, respectively.

In FIG. 36, the results of granting the use in response to the user's request of "select(C, r)" are indicated when R(A)@P=l, R(B)@P=s, and R(C)@P=s are set for the content data 201 (content A), the content data 202 (content B), and the content data 203 (content C) of FIG. 3, respectively.

In FIG. 37, the results of granting the use in response to the user's request of "select(C, r)" are indicated when R(A)@P=l, R(B)@P=s, and R(C)@P=l are set for the content data 201 (content A), the content data 202 (content B), and the content data 203 (content C) of FIG. 3, respectively.

In FIG. 38, the results of granting the use in response to the user's request of "select(C, r)" are indicated when R(A)@P=l, R(B)@P=l, and R(C)@P=s are set for the content data 201 (content A), the content data 202 (content B), and the content data 203 (content C) of FIG. 3, respectively.

In FIG. 39, the results of granting the use are indicated when R(A)@P=l, R(B)@P=l, and R(C)@P=l are set for the content data 201 (content A), the content data 202 (content B), and the content data 203 (content C) of FIG. 3, respectively.

In FIG. 40, the results of granting the use in response to the user's request of "select(D, r)" are indicated when R(D)@P=s, R(E)@P=s, and R(F)@P=s are set for the content data 301 (content D), the content data 302 (content E), and the content data 303 (content F) of FIG. 5, respectively. The request "select(D, r)" indicates that the user designates the content D at step S11 and "r" at steps S12 and S13.

In FIG. 40, the grant verification results of r∈R(D) are entered in the field F1, the grant verification results of r∈R(E) are entered in the field F2, and the grant verification results of r∈R(F) are entered in the field F3. The state of r∈R(D)=T, r∈R(E)=T, and r∈R(F)=T represents "all granted" at step S16 of the verifying process. The state of r∈R(D)=F, r∈R(E)=F, and r∈R(F)=F represents "all denied" at step S16 of the verifying process.

In the field F4, the structure list L2 is entered as the final product of the conflict solving process. Here, "D(E, (F))" indicates that the contents D, E, and F are available as the partial granted contents data 42, and that the content E is a component of the content D, and that the content F is a component of the content E. "Deny" denotes that the use is not granted, which is the same as the state of "nil(nil(nil))". In the field F5, the reason list M2 is entered as the final product of the conflict solving process.

As indicated in FIG. 40, the final verification result is obtained in accordance with the type of the verification result for r∈R(D), r∈R(E), and r∈R(F). The fields F1 to F5 are incorporated in FIGS. 41 to 63 in the same manner.

In FIG. 41, the results of granting the use in response to the user's request of "select(D, r)" are indicated when R(D)@P=s, R(E)@P=s, and R(F)@P=l are set for the content data 301 (content D), the content data 302 (content E), and the content data 303 (content F) of FIG. 5, respectively.

In FIG. 42, the results of granting the use in response to the user's request of "select(D, r)" are indicated when R(D)@P=s, R(E)@P=l, and R(F)@P=s are set for the content data 301 (content D), the content data 302 (content E), and the content data 303 (content F) of FIG. 5, respectively.

In FIG. 43, the results of granting the use in response to the user's request of "select(D, r)" are indicated when R(D)@P=s, R(E)@P=l, and R(F)@P=l are set for the content data 301 (content D), the content data 302 (content E), and the content data 303 (content F) of FIG. 5, respectively.

In FIG. 44, the results of granting the use in response to the user's request of "select(D, r)" are indicated when R(D)@P=l, R(E)@P=s, and R(F)@P=s are set for the content data 301 (content D), the content data 302 (content E), and the content data 303 (content F) of FIG. 5, respectively.

In FIG. 45, the results of granting the use in response to the user's request of "select(D, r)" are indicated when R(D)@P=l, R(E)@P=s, and R(F)@P=l are set for the content data 301 (content D), the content data 302 (content E), and the content data 303 (content F) of FIG. 5, respectively.

In FIG. 46, the results of granting the use in response to the user's request of "select(D, r)" are indicated when R(D)@P=l, R(E)@P=l, and R(F)@P=s are set for the content data 301 (content D), the content data 302 (content E), and the content data 303 (content F) of FIG. 5, respectively.

In FIG. 47, the results of granting the use in response to the user's request of "select(D, r)" are indicated when R(D)@P=l, R(E)@P=l, and R(F)@P=l are set for the content data 301 (content D), the content data 302 (content E), and the content data 303 (content F) of FIG. 5, respectively. In the field F4, "D(E(nil))" denotes that the contents D and E are available as the partial granted contents data 42 and that the content E is a component of the content D. "D(nil(F))" denotes that the contents D and F are available as the partial granted contents data 42, and that the content F is a component of the content D. "D(nil(nil))" denotes that only the content D is available as the partial granted contents data 42. "nil(E(F))" denotes that the contents E and F are available as the partial granted contents data 42, and that the content F is a component of the content E. "nil(E(nil))" denotes that only the content E is available as the partial granted contents data 42. "nil(nil(F))" denotes that only the content F is available as the partial granted contents data 42.

In FIG. 48, the results of granting the use in response to the user's request of "select(E, r)" are indicated when R(D)@P=s, R(E)@P=s, and R(F)@P=s are set for the content data 301 (content D), the content data 302 (content E), and the content data 303 (content F) of FIG. 5, respectively. In the field F4, "E(F)" denotes that the contents B and C are available as the partial granted contents data 42 and that the content F is a component of the content E.

In FIG. 49, the results of granting the use in response to the user's request of "select(E, r)" are indicated when R(D)@P=s, R(E)@P=s, and R(F)@P=l are set for the content data 301 (content D), the content data 302 (content E), and the content data 303 (content F) of FIG. 5, respectively.

In FIG. 50, the results of granting the use in response to the user's request of "select(E, r)" are indicated when R(D)@P=s, R(E)@P=l, and R(F)@P=s are set for the content data 301 (content D), the content data 302 (content E), and the content data 303 (content F) of FIG. 5, respectively.

In FIG. 51, the results of granting the use in response to the user's request of "select(E, r)" are indicated when R(D)@P=s, R(E)@P=l, and R(F)@P=l are set for the content data 301 (content D), the content data 302 (content E), and the content data 303 (content F) of FIG. 5, respectively. In the field F4, "E(nil)" denotes that only the content E is available as the partial granted contents data 42. "nil(F)" denotes that only the content C is available as the partial granted contents data 42.

In FIG. 52, the results of granting the use in response to the user's request of "select(E, r)" are indicated when R(D)@P=l, R(E)@P=s, and R(F)@P=s are set for the content data 301 (content D), the content data 302 (content E), and the content data 303 (content F) of FIG. 5, respectively.

In FIG. 53, the results of granting the use in response to the user's request of "select(E, r)" are indicated when R(D)@P=l, R(E)@P=s, and R(F)@P=l are set for the content data 301 (content D), the content data 302 (content E), and the content data 303 (content F) of FIG. 5, respectively.

In FIG. 54, the results of granting the use in response to the user's request of "select(E, r)" are indicated when R(D)@P=l, R(E)@P=l, and R(F)@P=s are set for the content data 301 (content D), the content data 302 (content E), and the content data 303 (content F) of FIG. 5, respectively.

In FIG. 55, the results of granting the use in response to the user's request of "select(E, r)" are indicated when R(D)@P=l, R(E)@P=l, and R(F)@P=l are set for the content data 301 (content D), the content data 302 (content E), and the content data 303 (content F) of FIG. 5, respectively.

In FIG. 56, the results of granting the use in response to the user's request of "select(F, r)" are indicated when R(D)@P=s, R(E)@P=s, and R(F)@P=s are set for the content data 301 (content D), the content data 302 (content E), and the content data 303 (content F) of FIG. 5, respectively. In the field F4, "F" denotes that the content F is available as the partial granted contents data 42.

In FIG. 57, the results of granting the use in response to the user's request of "select(F, r)" are indicated when R(D)@P=s, R(E)@P=s, and R(F)@P=l are set for the content data 301 (content D), the content data 302 (content E), and the content data 303 (content F) of FIG. 5, respectively.

In FIG. 58, the results of granting the use in response to the user's request of "select(F, r)" are indicated when R(D)@P=s, R(E)@P=l, and R(F)@P=s are set for the content data 301

(content D), the content data 302 (content E), and the content data 303 (content F) of FIG. 5, respectively.

In FIG. 59, the results of granting the use in response to the user's request of "select(F, r)" are indicated when R(D)@P=s, R(E)@P=l, and R(F)@P=l are set for the content data 301 (content D), the content data 302 (content E), and the content data 303 (content F) of FIG. 5, respectively.

In FIG. 60, the results of granting the use in response to the user's request of "select(F, r)" are indicated when R(D)@P=l, R(E)@P=s, and R(F)@P=s are set for the content data 301 (content D), the content data 302 (content E), and the content data 303 (content F) of FIG. 5, respectively.

In FIG. 61, the results of granting the use in response to the user's request of "select(F, r)" are indicated when R(D)@P=l, R(E)@P=s, and R(F)@P=l are set for the content data 301 (content D), the content data 302 (content E), and the content data 303 (content F) of FIG. 5, respectively.

In FIG. 62, the results of granting the use in response to the user's request of "select(F, r)" are indicated when R(D)@P=l, R(E)@P=l, and R(F)@P=s are set for the content data 301 (content D), the content data 302 (content E), and the content data 303 (content F) of FIG. 5, respectively.

In FIG. 63, the results of granting the use in response to the user's request of "select(F, r)" are indicated when R(D)@P=l, R(E)@P=l, and R(F)@P=l are set for the content data 301 (content D), the content data 302 (content E), and the content data 303 (content F) of FIG. 5, respectively.

As described above, when a conflict arises among the usage rules of the content data, a verification is made as to which of the content data are granted in accordance with the conflict solution policy defined in the usage rule of each content data. Thus, the components of the partial granted contents data 42 can be obtained in correspondence with different combinations of the grant verification results individually obtained for the content data. When a conflict arises among the conflict solution policies, a structure list is created based on the entirety priority or component priority defined in the policy priority order. For this reason, the partial granted contents data 42 can be generated in accordance with the usage environment.

The verification results dealt with in FIGS. 16 to 63 are based on the cases where the policy priority order is "component priority". However, even when the policy priority order is "entirety priority", the components of the partial granted contents data 42 are equally obtained in correspondence with different combinations of the grant verification results individually obtained for the content data. In addition, in the above examples, the conflict solution policies of "strict" and "more lenient" are used. However, even when the conflict solution policy of "most strict" or "less strict" is adopted, the components of the partial granted contents data 42 are also obtained in accordance with different combinations of the grant verification results individually obtained for the content data.

Returning to FIG. 13, the conflict solving unit 25 determines whether each of the content data included in the tree structure data 41 should be granted in accordance with the structure list L2 created at step S20 (step S21). More specifically, among the content data included in the structure list L2, the conflict solving unit 25 determines that the use of the content data for which "nil" is written in should be denied.

When it is determined at step S21 that the use of all the contents should be denied, or in other words, when "nil" is written in for all the content data ("denied" at step S21), the reason presenting unit 29 displays the names of the content data listed on the reason list M2 onto the displaying unit 13, as content data that are the cause of the denial (step S22).

After step S22, when the operation/condition designating unit 22 receives information instructing a change of the target contents or the usage rules (Yes at step S23), the system returns to step S11. After step S22, when the operation/condition designating unit 22 receives information instructing the termination of the process (No at step S23), the process is terminated.

On the other hand, when it is determined at step S21 that part of or all of the contents are granted, in other words when "nil" is written in for part of the contents or for none of the contents ("granted" at step S21), the partial-granted contents-data generating/presenting unit 27 generates contents data having granted contents (partial granted contents data 42) from the contents data 31 in accordance with the structure list L2 created at step S20, and then displays the partial granted contents data on the displaying unit 13 (step S24).

Thereafter, the reason presenting unit 29 displays the denied contents on the displaying unit 13 in accordance with the reason list M2 created at step S20, under the control of the partial-granted contents-data generating/presenting unit 27 (step S25). The partial-granted contents-data generating/presenting unit 27 also displays on the displaying unit 13 information prompting the user as to whether the generated partial granted contents data will be used.

After step S25, when the operation/condition designating unit 22 receives information indicating that the partial granted contents data will be used (Yes at step S26), the contents operation executing unit 28 executes the operation designated at step S26 onto the partial granted contents data generated at step S24, under the control of the partial-granted contents-data generating/presenting unit 27 (step S27), and the process is terminated.

When the operation/condition designating unit 22 receives information instructing a change of the target contents or the usage rules at step S26 (No at step S26 to Yes at step S28), the system returns to step S11. When the operation/condition designating unit 22 receives information instructing the termination of the process at step S26 (No at step S19), the process is terminated.

A specific example of the execution of the above process is given below with reference to FIGS. 64 to 68. The example adopts the contents data 200 illustrated in FIG. 3 as the contents data 31, but the contents data is not limited thereto.

Figure 64:
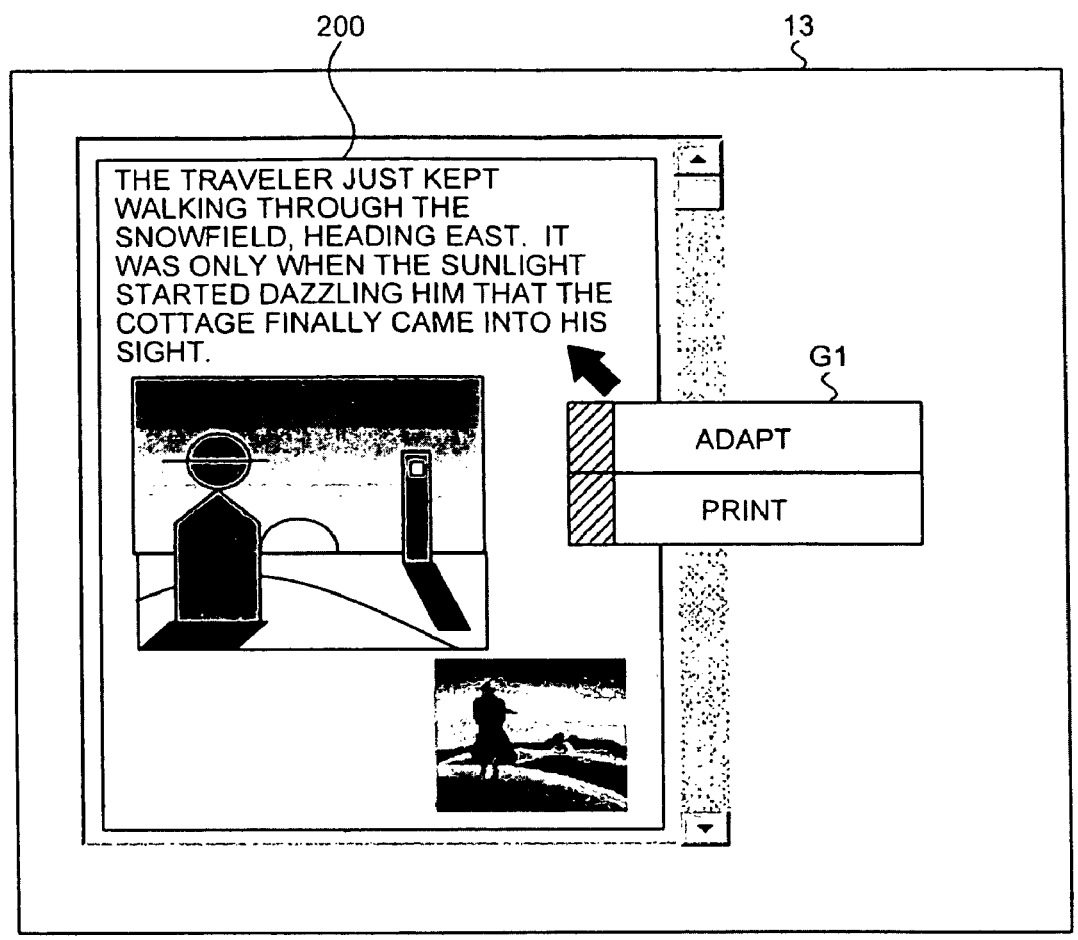
FIG. 64 is a diagram for showing an example of a screen displayed on a displaying unit.

FIG. 64 is a diagram of a display screen presented when the contents displaying/designating unit 21 executes the process at step S11. The contents displaying/designating unit 21 displays the contents data 200 on the displaying unit 13 so that the user can designate a content that the user wishes to use from the contents data 200, and then displays a screen G1 to designate an operation to be performed on the designated content. When the user designates, by way of the operating unit 12, the content data 201 (content A) as a content that the user wishes to use, the contents displaying/designating unit 21 determines content X=content A as a target content (content X). Thus, the content A is set to the operation target.

Figure 65:
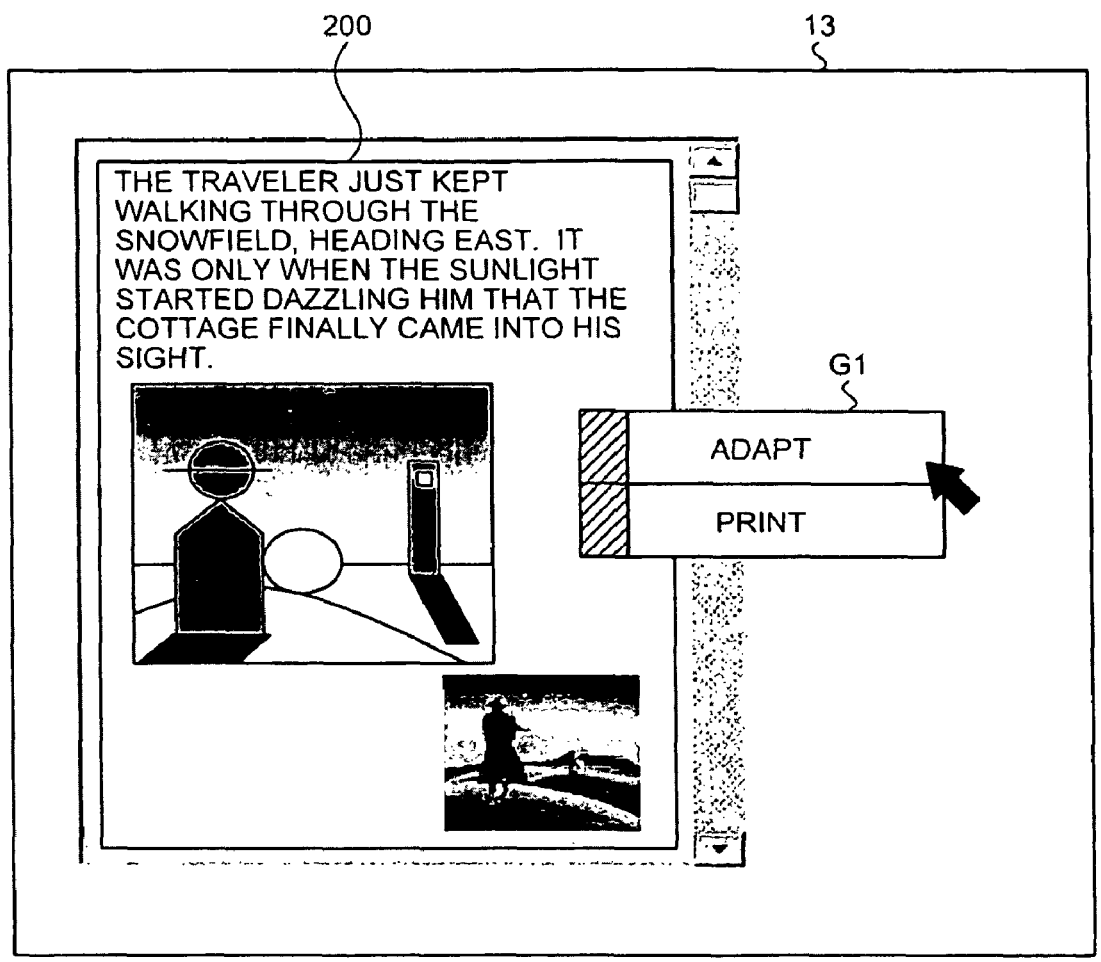
FIG. 65 is a diagram for showing another example of a screen displayed on a displaying unit.

FIG. 65 is a diagram for showing an example of a display screen presented when the operation/condition designating unit 22 executes the process at step S12. When "adapt" is designated from the screen G1 for the content data 201, the operation/condition designating unit 22 receives r.right=adapt as an operation to be performed onto the content X.

Figure 66:
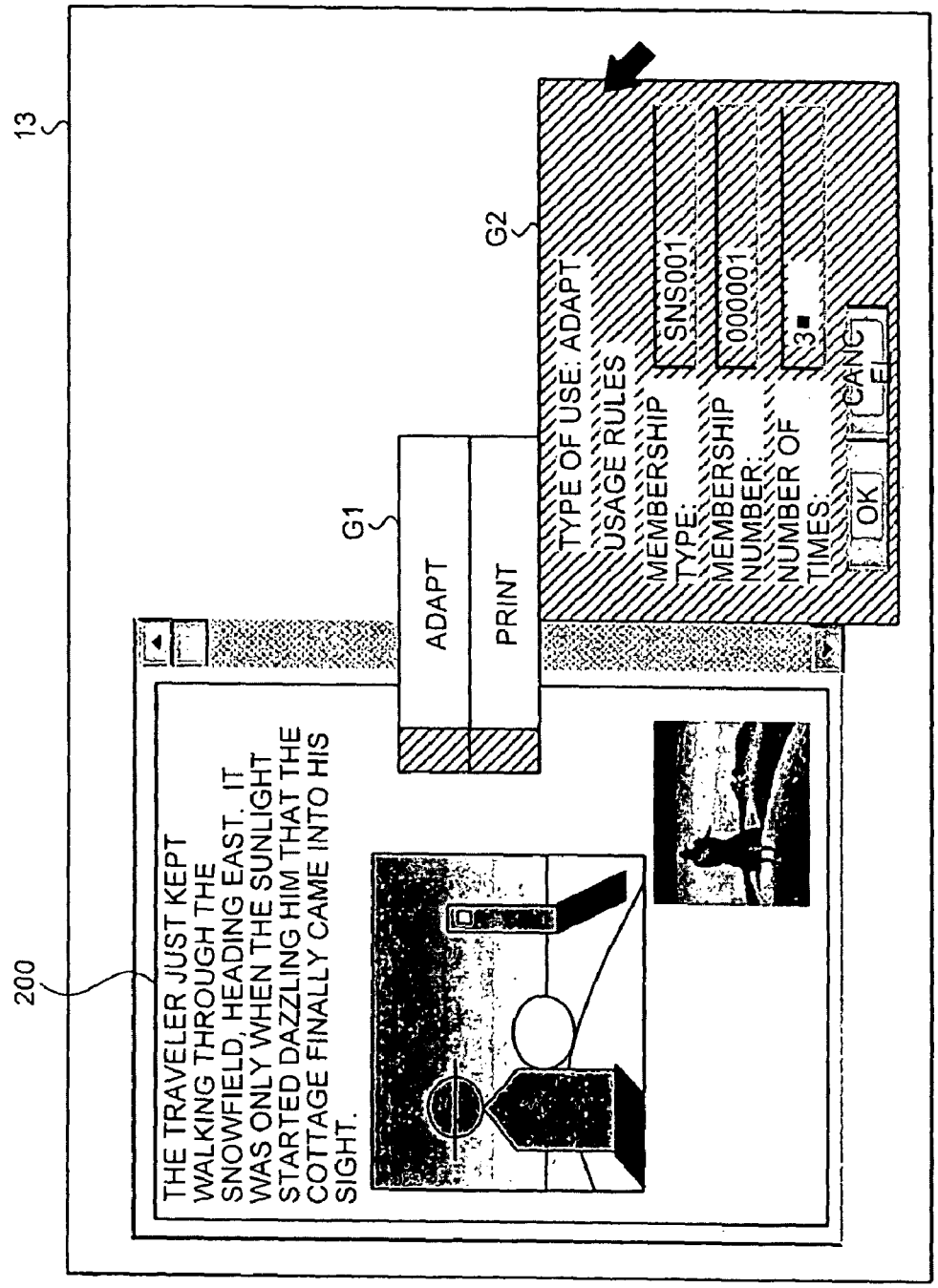
FIG. 66 is a diagram for showing still another example of a screen displayed on a displaying unit.

FIG. 66 is a diagram for showing an example of a screen presented when the operation/condition designating unit 22 executes the process at step S13. The operation/condition designating unit 22 displays a screen G2 to support the input of the selected usage rule. In the example of FIG. 66, the screen G2 includes fields for inputting "membership type", "membership number", and "number of times" of adapting (copying).

When the user inputs necessary items into the fields of the screen G2, the operation/condition designating unit 22 receives the character strings input to the fields as selected usage rules. For example, when "membership type: SNS001, membership number: 000001, number of times: 3" is input as shown in FIG. 66, "r.principal=(SNS001, 000001), r.condition.exerciseLimit=3" is stored in the RAM 15 or the like.

Figure 67:
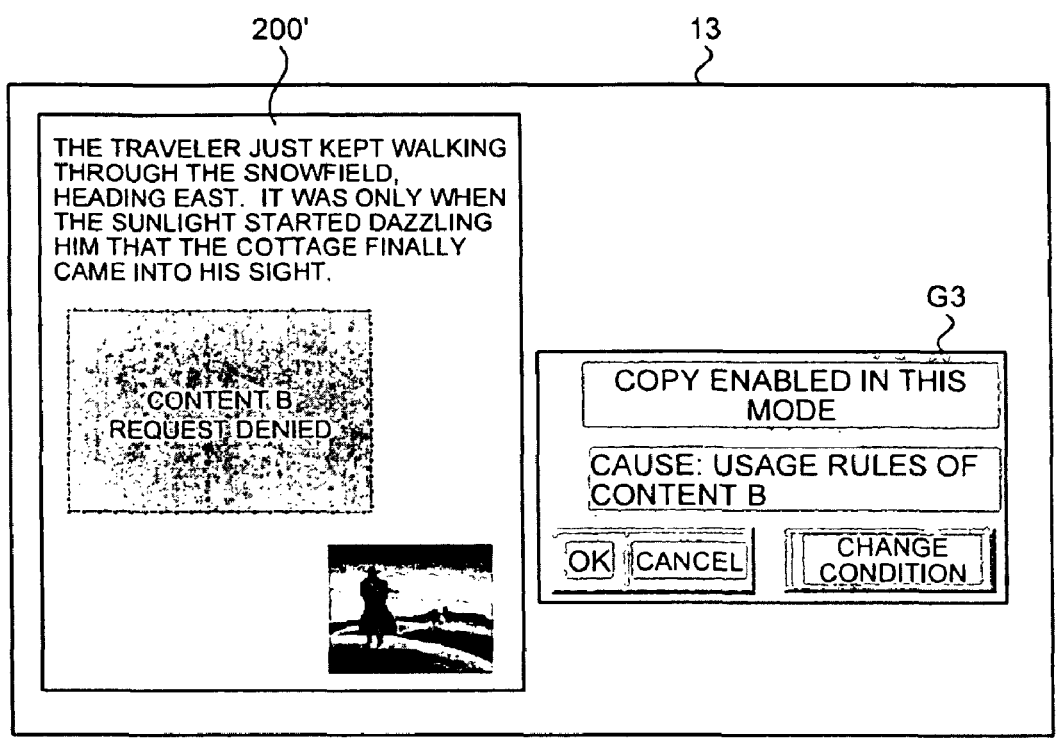
FIG. 67 is a diagram for showing still another example of a screen displayed on a displaying unit.

FIG. 67 is a diagram for showing an example of a display screen presented when the partial-granted contents-data generating/presenting unit 27 executes the process at step S25 based on the results of the processes performed at steps S14 through S24. In advance to the presentation of this display screen, the functional units individually execute the following processes, based on the data stored in the course of FIGS. 64 through 66 and the usage rules of the contents.

1. The content structure analyzing unit 23 executes the process at step S14, through which the tree structure data 41 as shown in FIG. 11 is generated.

2. The individual material verifying unit 24 executes the process at steps S15 and S16, where a verification is made on the use of the content data included in the tree structure data. The result of the verification is "content A: True, content B: False, content C: True", and the individual material verification data describing this result is generated (see the fields F1 to F3 of the verification result R1 in FIG. 22).

3. The conflict solving unit 25 and the contents conflict solving unit 26 execute the process at step S20, and thereby the structure list L2 indicated in the field F4 of the verification result R1 and the reason list M2 indicated in the field F5 are created as shown in FIG. 22.

Thereafter, the partial-granted contents-data generating/presenting unit 27 executes the process at step S24 to generate the partial granted contents data 42 from the contents data 31 in accordance with the structure list L2 and to display the result on the displaying unit 13. In the example of FIG. 67, partial granted contents data 200' is displayed as the generated partial granted contents data 42. The field of displaying the content A in the partial granted contents data 200' indicates that the use of the content A is denied.

FIG. 68 is a diagram of the partial granted contents data 200' of FIG. 67 described in MPEG-21 form. Because the use of the content A is denied, the content B is left empty. The contents A and C are maintained (extracted) (see 210' and 214 in the drawing).

The partial-granted contents-data generating/presenting unit 27 displays a screen G3 to prompt the user as to whether the partial granted contents data 200' will be used, as shown in FIG. 67. The reason presenting unit 29 presents the names of the content data listed on the reason list M2 onto the screen G3 under the control of the partial-granted contents-data generating/presenting unit 27 (step S25).

When the "OK" button is pressed down on the screen G3 by way of the operating unit 12, and when the operation/condition designating unit 22 receives this information (Yes at step S26), the contents operation executing unit 28 executes the operation "copy (adapt)" designated by the user onto the partial granted contents data 31' under the control of the partial-granted contents-data generating/presenting unit 27 (step S27).

When a "change condition" button is pressed down on the screen G3 by way of the operating unit 12, and when the operation/condition designating unit 22 receives this information (Yes at step S26 to Yes at step S27), the system returns to step S11. The contents displaying/designating unit 21 again displays the screen shown in FIG. 64.

When a "cancel" button is pressed down on the screen G3 by way of the operating unit 12, and when the operation/condition designating unit 22 receives this information (Yes at step S26 to No at step S27), the process is terminated.

According to the present embodiment, the content processing apparatus 100 can determine which content data is available in accordance with the conflict solution policy that is associated with the usage rule of each of the content data when a conflict occurs among the usage rules of the content data, and generate partial granted contents data that includes the available content data. Thus, the conflict in relation to the usage rules of the content data can be flexibly solved, and the usage control can be conducted as the provider of the contents intends.

In addition, by displaying the name of the content data that has caused a denial of use, the user can recognize which of the content data is the cause of the denial. In this manner, the content processing apparatus 100 can support a change of the operation and the selected usage rule.

The exemplary embodiments of the present invention have been explained, but the invention is not limited thereto. Any modifications, replacements, or additions may be made to the present invention without departing from a scope of the invention.

For example, a program for the above process may be offered in a computer-readable recording medium. Any recording medium that is configured to record programs therein and to be read by a computer, such as a magnetic disk, an optical disk (e.g., a CD-ROM, a CD-R, and a DVD), a magneto-optical disk (e.g., an MO), and a semiconductor memory, can be adopted, and any recording format can be adopted.

Furthermore, the program for executing the above process may be stored on a computer connected to a network such as the Internet and downloaded via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a first storage unit that stores composite contents data hierarchically formed of a plurality of content data, the plurality of content data being individually usable;
a second storage unit that stores a plurality of usage rules defined for each usage type and a conflict solution policy, the usage rules individually defining conditions for verifying a grant/denial of use for each of the content data, the conflict solution policy defining a determination method of verifying the grant/denial of use;
a first receiving unit that receives a designation of a specific content data from among the content data forming the composite contents data;
a second receiving unit that receives an input a usage type of the specific content data;
a first verifying unit that individually reads, for each of the content data forming the composite contents data containing the specific content data, a usage rule corresponding to the usage type received by the second receiving unit from among the usage rules stored in association with the content data, and verifies the grant/denial of use for the each content data based on the read usage rule;

a second verifying unit that verifies which of the content data is available based on the determination method of the conflict solution policy associated with the each content data, when the results of the verification performed by the first verifying unit reveal that there is a conflict among the content data;

a conflict solving unit that generates structural information indicating a hierarchical relation between content data verified as being available by the second verifying unit, based on the hierarchical relation between the content data forming the composite contents data; and a generating unit that generates partial granted content data hierarchically formed of the content data verified as available by the second verifying unit, based on the structural information, wherein the conflict solution policy defines, as the determination method of verifying the grant/denial of use, any one of full agreement requiring all the content data included in the composite contents data to satisfy the usage rules, lineal-line agreement requiring the content data received by the second receiving unit and content data of upper and lower levels than the content data to all satisfy the usage rules, lower-level component full agreement requiring the content data received by the second receiving unit and the content data of the lower levels than the content data to all satisfy the usage rules, and lower-level component agreement granting use of content data that satisfy the usage rules from among the content data received by the second receiving unit and the content data of the lower levels than the content data.

2. The apparatus according to claim 1, further comprising a third storage unit that stores a policy priority order that defines a structural information generating method when a conflict occurs among the verification results made in accordance with conflict solution policies, wherein the conflict solving unit generates the structural information based on the structural information generating method defined by the policy priority order, when the structures of the content data that are determined as available by the second verifying unit are different among the conflict solution policies.

3. The apparatus according to claim 2, wherein the policy priority order defines that a conflict solution policy for an content data associated with the top level of the structural information is given a first priority among the conflict solution policies associated with the usage rules for the content data, and that the structural information is generated in accordance with the conflict solution policy.

4. The apparatus according to claim 2, wherein the policy priority order defines that a conflict solution policy for a content data associated with the bottom level of the structural information is given a first priority among the conflict solution policies associated with the usage rules for the content data, and that the structural information is generated in accordance with the conflict solution policy.

5. The apparatus according to claim 1, wherein the second verifying unit verifies which of the content data is available based on the determining method of a conflict solution policy associated with the usage rule for the content data received by the first receiving unit, when the verification results for content data of upper levels made by the second verifying unit are different from the verification results for content data of lower levels made by the second verifying unit.

6. The apparatus according to claim 1, further comprising a presenting unit that presents one or more content data that is verified by the first verifying unit as not satisfying the usage rule.

7. The apparatus according to claim 1, further comprising:
a recording unit that records one or more content data that has caused the denial of use on a reason list for every verification made by the second verifying unit; and
a presenting unit that presents the content data recorded on the reason list.

8. A content processing method performed by an information processing apparatus, wherein the apparatus includes
a first storage unit that stores composite contents data hierarchically formed of a plurality of content data, the plurality of content data being individually usable, and
a second storage unit that stores a plurality of usage rules defined for each usage type and a conflict solution policy, the usage rules individually defining conditions for verifying a grant/denial of use for each of the content data, the conflict solution policy defining a determination method of verifying the grant/denial of use, and the method comprising:

first receiving a designation of a specific content data from among the content data forming the composite contents data;

second receiving an input of a usage type of the specific content data;

first verifying the grant/denial of use for the each content data forming the composite contents data containing the specific content based on a usage rule corresponding to the usage type received by the second receiving from among the usage rules stored in association with the content data;

second verifying which of the content data is available based on the determination method of the conflict solution policy associated with the each content data, when the results of the verification performed by the first verifying reveal that there is a conflict among the content data;

generating structural information indicating a hierarchical relation between content data verified as available by the second verifying, based on the hierarchical relation between the content data forming the composite contents data; and generating partial granted content data hierarchically formed of the content data verified as available by the second verifying, based on the structural information, wherein the conflict solution policy defines, as the determination method of verifying the grant/denial of use, any one of full agreement requiring all the content data included in the composite contents data to satisfy the usage rules, lineal-line agreement requiring the content data received by the second receiving and content data of upper and lower levels than the content data to all satisfy the usage rules, lower-level component full agreement requiring the content data received by the second receiving and the content data of the lower levels than the content data to all satisfy the usage rules, and lower-level component agreement granting use of content data that satisfy the usage rules from among the content data received by the second receiving and the content data of the lower levels than the content data.

9. A computer program product having a non-transitory computer readable medium including programmed instructions executable in a computer, wherein the computer includes a first storage unit that stores composite contents data hierarchically formed of a plurality of content data, the plurality of content data being individually usable, and a second storage unit that stores a plurality of usage rules defined for each usage type and a conflict solution policy, the usage rules individually defining conditions for verifying a grant/denial of use for each of the content data, the conflict solution policy defining a determination method of verifying the grant/denial of use, wherein the instructions, when executed by the computer, cause the computer to perform a method comprising:

first receiving a designation of a specific content data from among the content data forming the composite contents data;

second receiving an input of a usage type of the specific content data;

first verifying the grant/denial of use for the each content data forming the composite contents data containing the specific content based on a usage rule corresponding to the usage type received by the second receiving from among the usage rules stored in association with the content data;

second verifying which of the content data is available based on the determination method of the conflict solution policy associated with the each content data, when the results of the verification performed by the first verifying reveal that there is a conflict among the content data;

generating structural information indicating a hierarchical relation between content data verified as available by the second verifying, based on the hierarchical relation between the content data forming the composite contents data; and generating partial granted content data hierarchically formed of the content data verified as available by the second verifying, based on the structural information, wherein the conflict solution policy defines, as the determination method of verifying the grant/denial of use, any one of full agreement requiring all the content data included in the composite contents data to satisfy the usage rules, lineal-line agreement requiring the content data received by the second receiving and content data of upper and lower levels than the content data to all satisfy the usage rules, lower-level component full agreement requiring the content data received by the second receiving unit and the content data of the lower levels than the content data to all satisfy the usage rules, and lower-level component agreement granting use of content data that satisfy the usage rules from among the content data received by the second receiving and the content data of the lower levels than the content data.

* * * * *